(12) United States Patent
Liepa

(10) Patent No.: US 6,232,980 B1
(45) Date of Patent: May 15, 2001

(54) SYSTEM AND METHOD FOR GENERATING PLANAR MAPS OF THREE-DIMENSIONAL SURFACES

(75) Inventor: Peter Liepa, Toronto (CA)

(73) Assignee: Silicon Graphics, Inc., Mountain View, CA (US)

(*) Notice: Subject to any disclaimer, the term of this patent is extended or adjusted under 35 U.S.C. 154(b) by 0 days.

(21) Appl. No.: 09/040,452

(22) Filed: Mar. 18, 1998

(51) Int. Cl.[7] .................................................. G06T 15/00
(52) U.S. Cl. ............................................ 345/430; 345/425
(58) Field of Search ..................................... 345/430, 425, 345/418, 419, 429, 431, 432

(56) References Cited

U.S. PATENT DOCUMENTS

| | | | |
|---|---|---|---|
| 5,107,444 | * 4/1992 | Wu ........................................ | 345/419 |
| 5,319,744 | * 6/1994 | Kelly et al. ........................... | 345/436 |
| 5,448,687 | * 9/1995 | Hoogerhyde et al. ............... | 345/425 |
| 5,903,270 | * 5/1999 | Gentry et al. ........................ | 345/419 |
| 5,949,425 | * 9/1999 | Willis .................................... | 345/428 |
| 5,986,664 | * 11/1999 | Dijkstra et al. ..................... | 345/429 |

FOREIGN PATENT DOCUMENTS

08287286 * 11/1996 (JP) ............................... G06T/15/00

OTHER PUBLICATIONS

IBM TDB, Mar. 1, 1991, vol. 33, issue 10B, pp. 463–468.*
IBM TDB, May 1, 1973, vol. 15, issue 12, pp. 3726–3729.*

* cited by examiner

*Primary Examiner*—Mark Zimmerman
*Assistant Examiner*—Cliff N. Vo
(74) *Attorney, Agent, or Firm*—Sterne, Kessler, Goldstein & Fox P.L.L.C.

(57) ABSTRACT

Planar texture maps which reflect the distances and angles of a 3-D surface are generated. A user is permitted to manually adjust the balance between discontinuity and distortion. The user selectively modifies the 3-D surface, and by doing so adjusts the balance between discontinuity and distortion in the planar map. Each point on the 3-D surface corresponds to a unique point on the planar map. Operations may therefore be performed on the simpler 2-D planar map rather than the more complex 3-D map, and the result of the operations may be uniquely mapped to the 3-D surface. Further, the majority of the vertices on a 3-D surface are mapped automatically, even though the user maintains a high degree of control over the mapping process via altering the 3-D surface boundary. User-selected map vertices may be pinned to a user-selected location, and held fixed while a conventional relaxation technique is applied. This provides the user with a greater degree of control over the relaxation process.

20 Claims, 20 Drawing Sheets

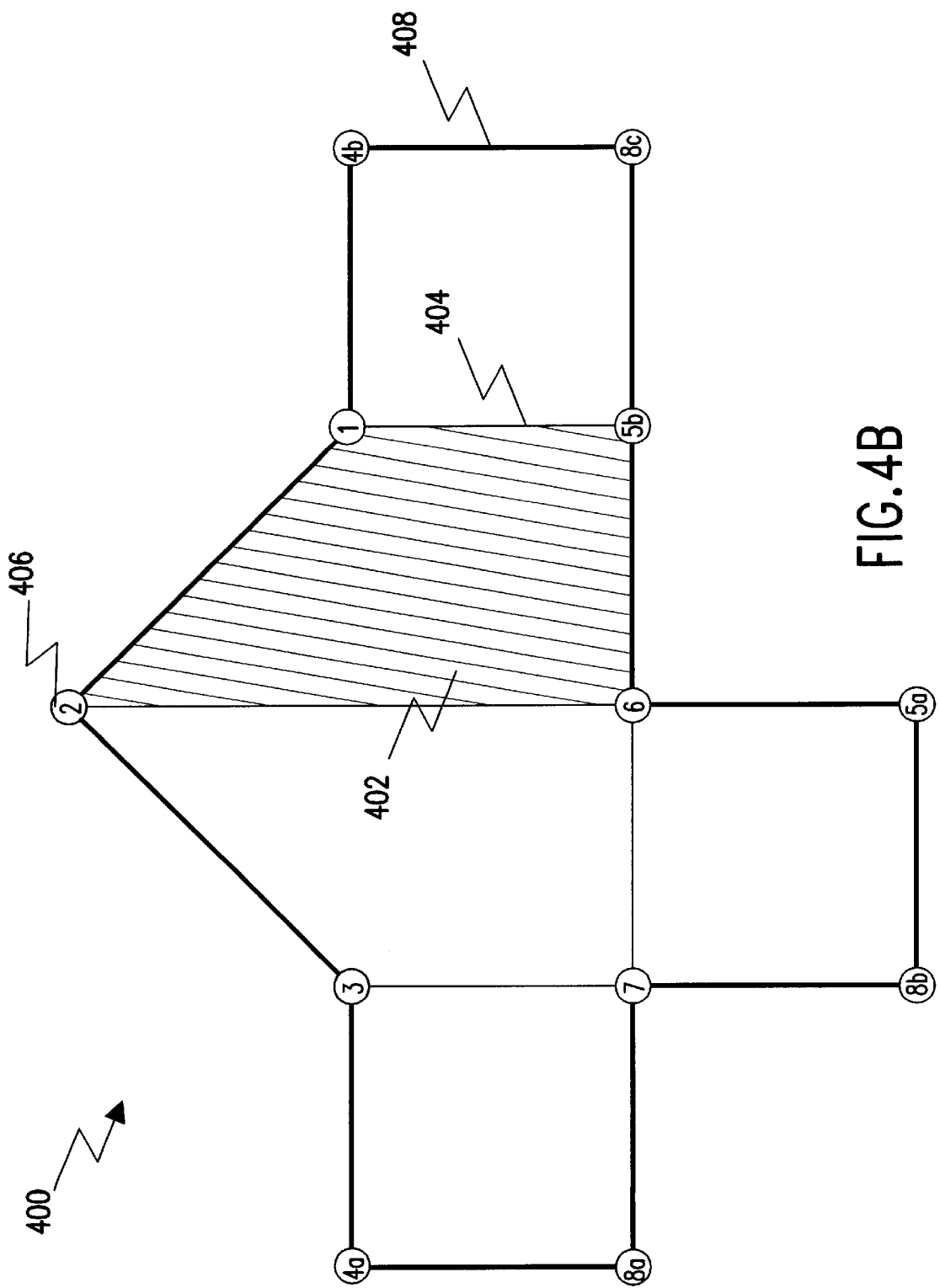

SYSTEM AND METHOD FOR GENERATING PLANAR MAPS OF THREE-DIMENSIONAL SURFACES

BACKGROUND OF THE INVENTION

1. Field of the Invention

The present invention relates generally to computer graphics, and more particularly to the generation of planar maps of three-dimensional surfaces.

2. Related Art

The problem of flattening a three dimensional (3-D) surface into a two-dimensional (2-D) domain is age old and takes several forms.

For example, one of the central concerns of cartography is the representation of a sphere as a planar map. As is well known, it is impossible to represent such a surface in 2-D without distortion and discontinuity. In a Mercator projection, for example, Greenland appears much larger than it really is in relation to more southern countries. Cartographers mitigate this problem either by cutting the surface of the globe into segments, thus trading off increased discontinuity for decreased distortion, or by using other projections which trade off size distortions for shape distortions.

Other application areas involve surface flattening, or the inverse problem, the construction of 3-D surfaces from originally flat components. An example of flattening involves taking the hide of an animal and creating flat pieces of leather or fur. An example of the inverse process is the construction of apparel such as shoes and garments out of pieces of leather, fur, or cloth. Going in either direction involves stretching/shrinking (distortion) and the alteration of discontinuity/continuity (e.g., by cutting or sewing).

The problem of correspondences between flat and curved surfaces arises in computer graphics software. A technique known as texture mapping is used to give 3-D surfaces character and realism. Whenever there exists a mapping from a 3-D surface to a 2-D region, an arbitrary image can be identified with the 2-D region so that rendered attributes of the surface (e.g., color, shininess, displacement) are controlled by the image's values. An image used in this way is called a texture map.

For 3-D surfaces such as bicubic patches, the mapping from surface to a 2-D region is intrinsic. However, for 3-D surfaces composed of polygons, an a priori mapping does not exist. The construction of such mappings, known as parameterization, has been a problem in computer graphics for several years because without a parameterization a polygonal surface is not amenable to texture mapping. Parameterization is equivalent to flattening.

Some conventional parameterization methods involve 1) selecting a boundary on a 3-D surface, 2) mapping the boundary to a planar convex polygon, and 3) using relaxation methods to calculate a mapping of interior points of the surface to interior points of the convex polygon. To visualize this process, imagine the 3-D surface to be a rubber sheet whose boundary is stretched around the perimeter of the polygon.

A drawback with these methods is that the planar convex polygon (e.g., a circle or square) does not necessarily reflect the shape of the surface boundary, thus increasing the possibility that the mapping will introduce shape distortions, particularly in polygons close to the boundary. A need therefore exists for an improved system and method for creating a planar boundary which inherits the geometry of a given surface boundary.

SUMMARY OF THE INVENTION

Briefly stated, the present invention is directed to a system and method for generating planar maps which reflect the distances and angles of a 3-D surface, where the user can manually adjust the balance between discontinuity and distortion.

A preferred embodiment of the present invention includes receiving a 3-D surface, defining a surface boundary on the 3-D surface, and generating a planar map based on the 3-D surface and the defined surface boundary. An edge-and-angle proportional mapping is preferably used to map the surface boundary to a map boundary. Those surface vertices not forming the surface boundary are then relaxed to create the map vertices not forming the map boundary.

A feature of the present invention is that a user selectively adjusts the balance between discontinuity and distortion in the planar map.

Another feature is that the present invention allows for the creation of planar maps such that each point on the 3-D surface corresponds to a unique point on the planar map. As a result, operations may be performed on the simpler 2-D planar map rather than the more complex 3-D map, and the result of the operations may be uniquely mapped to the 3-D surface.

Another feature of the present invention is that the majority of the vertices on a 3-D surface are mapped automatically, even though the user maintains a high degree of control over the mapping process via altering the 3-D surface boundary.

Another feature of the present invention is that user-selected map vertices may be pinned to a user-selected location, and held fixed while a conventional relaxation technique is applied. This provides the user with a greater degree of control over the relaxation process.

Another feature of the present invention is that a map boundary interpolation can be performed to generate alternate planar maps. These alternate planar maps may be superior in some respect to non-interpolated planar maps.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 4B depicts an example distortionless planar map of the example 3-D surface after cuts;

DETAILED DESCRIPTION OF THE PREFERRED EMBODIMENTS

Overview of the Environment

Figure 1:
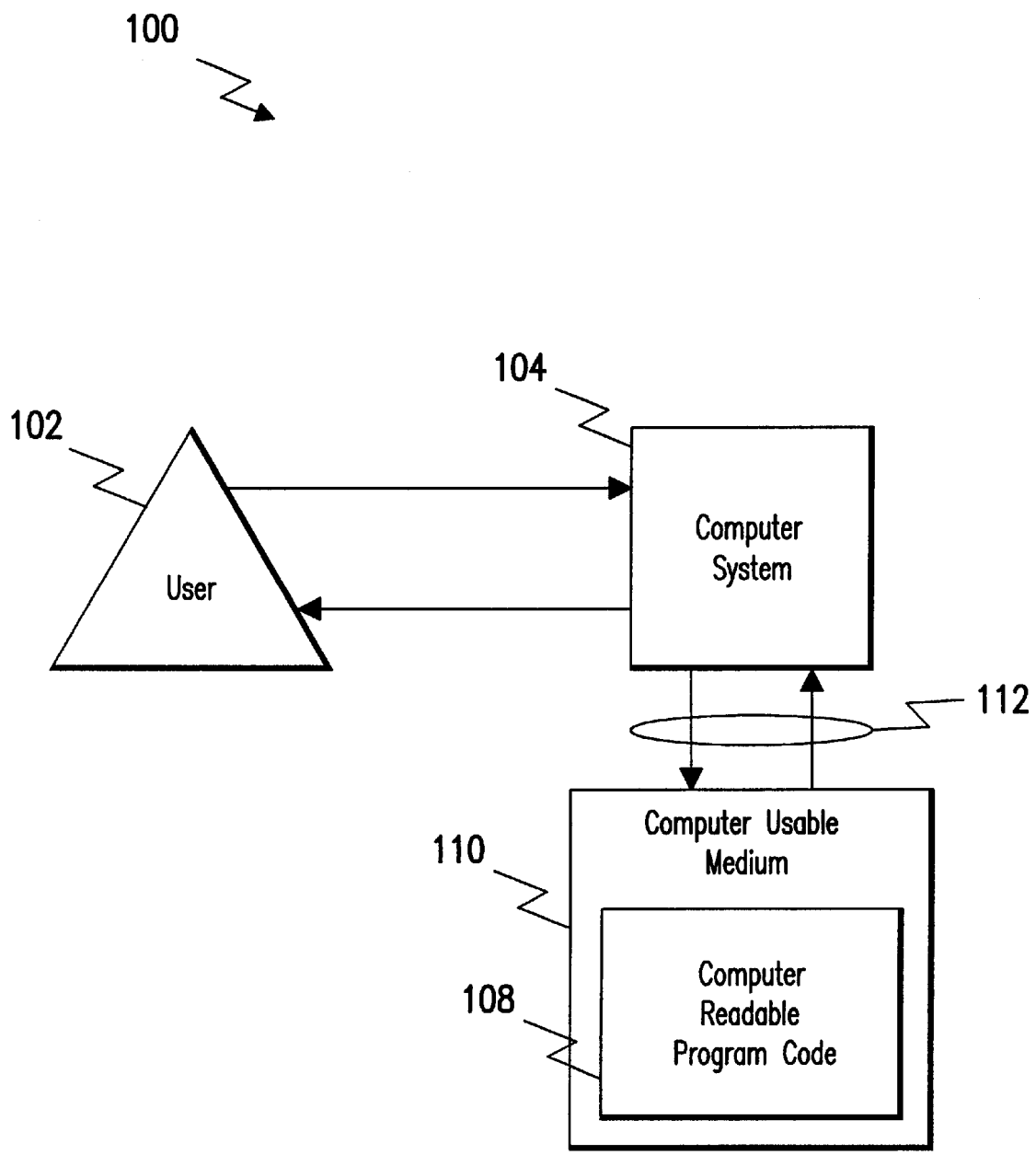
FIG. 1 is a block diagram of a digital computer environment within which the present invention is used.

FIG. 1 is a block diagram of a digital computer environment 100 within which the present invention is used. A user 102 interacts with a computer system 104 according to conventional user interface techniques. The present invention is preferably implemented as computer readable program code 108 stored on a computer usable medium 110, accessed via a communication link 112. Computer system 104 operates under the control of computer readable program code 108.

Computer system 104 represents any computer system known to those skilled in the art with sufficient capability (i.e., both memory and processing power) to execute computer readable program code 108. Examples of computer system 104 include, but are not limited to, a microcomputer, workstation, or terminal connected to a central processor.

Computer usable medium 110 is any digital memory capable of storing computer readable program code 108. Examples of computer usable medium 110 include, but are not limited to, hard disks (both fixed and portable), floppy disks, and CD-ROMs.

Communication link 112 provides the communication pathway between computer system 104 and computer usable medium 110. Communication link 112 includes, but is not limited to, parallel cables, local area networks, wide area networks, the Internet, and any other combination of electrical equipment designed to pass an electrical signal from one point to another.

User 102 communicates with computer system 104 according to conventional user input/output (I/O) techniques. Computer system 104 (under the control of computer readable program code 108) provides output to user 102 according to the present invention via video displays and audio messages, for example. User 102 provides input to computer system 104 via a keyboard, mouse, joystick, voice recognition, or any other type of input device known to those skilled in the art.

The present invention is preferably implemented as computer readable program code 108. Computer readable program code 108 provides the instructions necessary for computer system 104 to execute the functionality described below. Those skilled in the art will recognize that computer readable program code 108 might be implemented in any computer language (e.g., C) acceptable to computer system 104.

The present invention is described below in terms of computer graphics displays and operations performed upon these displays. Example graphical displays are provided, along with flowcharts which describe various operations performed on the displays. Those skilled in the art will readily recognize how to implement the graphical displays and operations on those displays as computer readable program code 108.

Over View of the Invention

Figure 2:
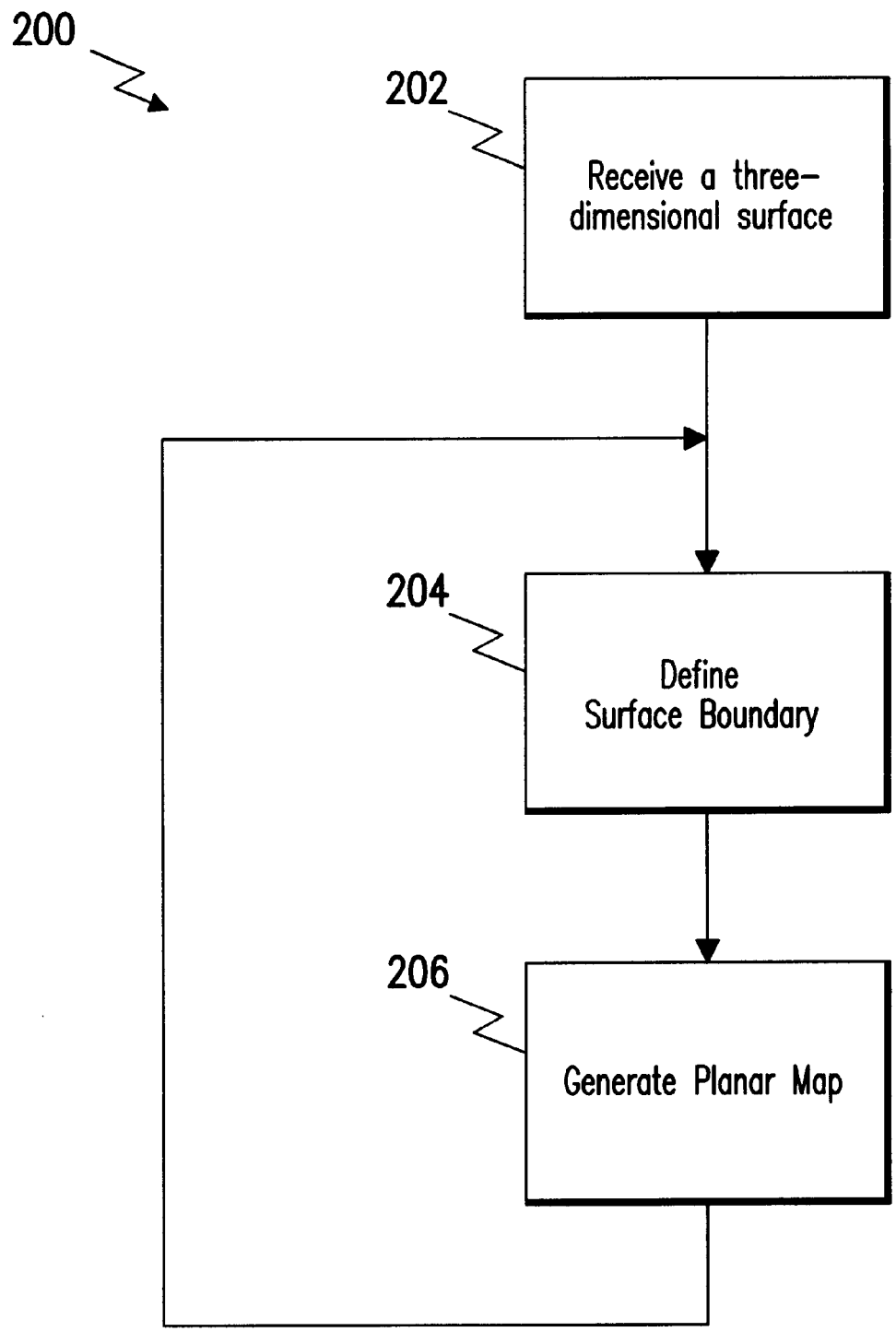
FIG. 2 is a flowchart illustrating the functions performed according to the present invention.

The purpose of this section is to provide an overview of the functionality encompassed by the present invention. FIG. 2 is a flowchart 200 describing functions performed by computer system 104 under the control of computer readable program code 108 according to the present invention, and the relative order in which these functions preferably occur. Those skilled in the art will recognize that these steps might equivalently be performed in different sequence, and still achieve the results described below.

Figure 3A:
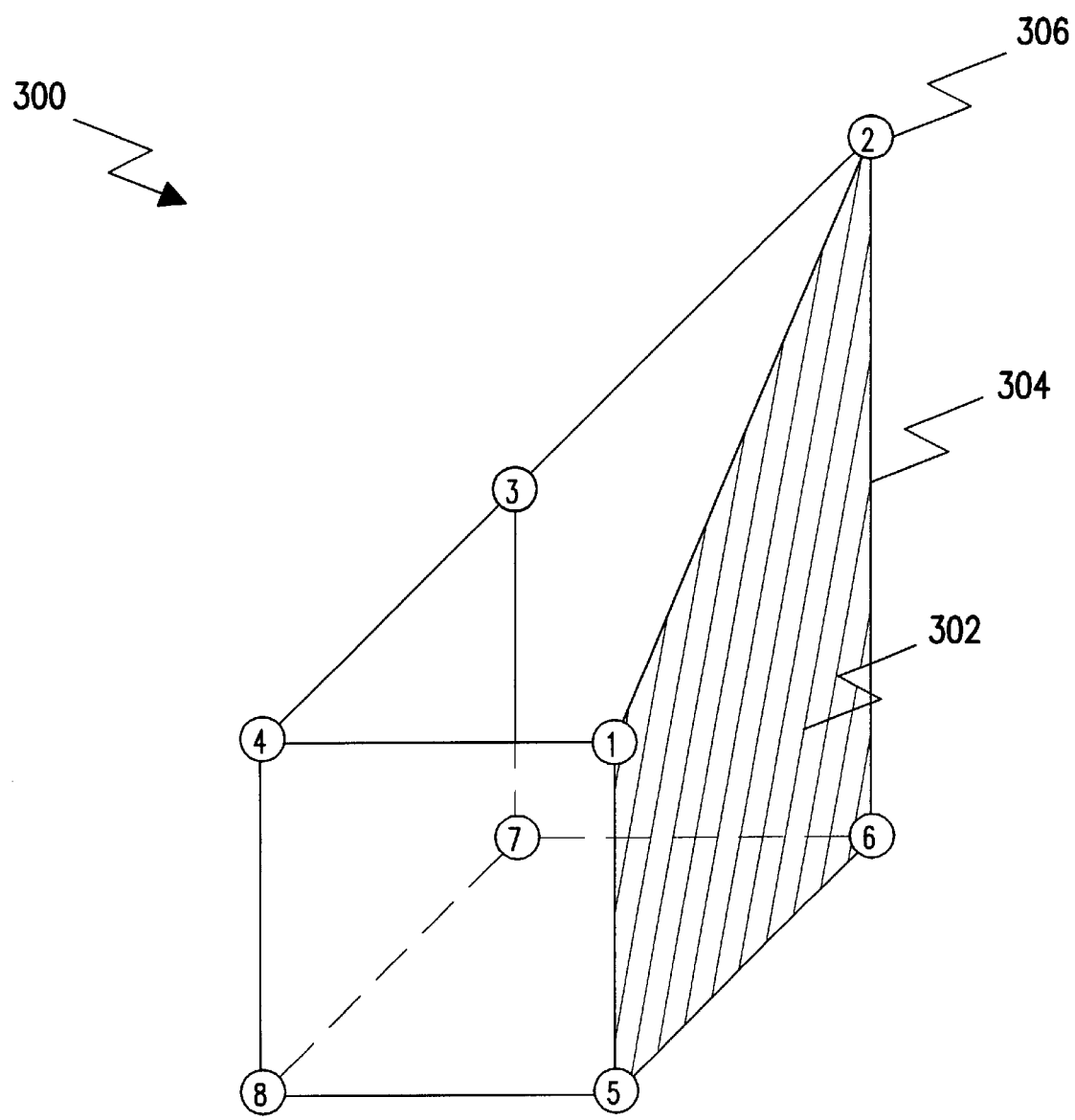
FIG. 3A depicts an example 3-D surface.

In step 202, computer system 104 receives a 3-D surface. FIG. 3A depicts an example 3-D surface 300. The functionality of the present invention is described below as operations on 3-D surface 300—those skilled in the art will recognize how these operations would apply to any arbitrary 3-D surface. Those skilled in the art will also recognize that 3-D surface 300 can be received from any digital memory accessible via communication link 112, not just computer usable medium 110.

3-D surface 300 includes one or more surface primitives 302. A surface primitive 302 is a planar region bounded by surface edges 304. A surface vertex 306 is the point at which two or more surface edges 304 meet. Consider 3-D surface 300. Surface vertices 306 are labeled with a single digit number between 1 and 8, and will be referred to, e.g., as surface vertex 1. Surface edges 304 will be referred to herein with reference to the surface vertices 306 each particular edge connects. For example, surface edge 304 connecting surface vertex 2 and 6 will be referred to as surface edge 2-6. Similarly, surface primitives 302 will be referred to with reference to the surface vertices 306 surrounding each particular surface primitive. For example, surface primitive 302 bounded by surface vertices 1, 2, 6, and 5 will be referred to as surface primitive 1-2-6-5 (shown in FIG. 3A as the shaded region). 3-D surface 300 is an "open-topped" box-surface vertices 1 and 3 are not connected, and surface primitives 1-2-3 and 1-3-4 do not exist. 3-D surface 300 therefore includes five surface primitives 302, eight surface vertices 306, and twelve surface edges 304.

Figure 3B:
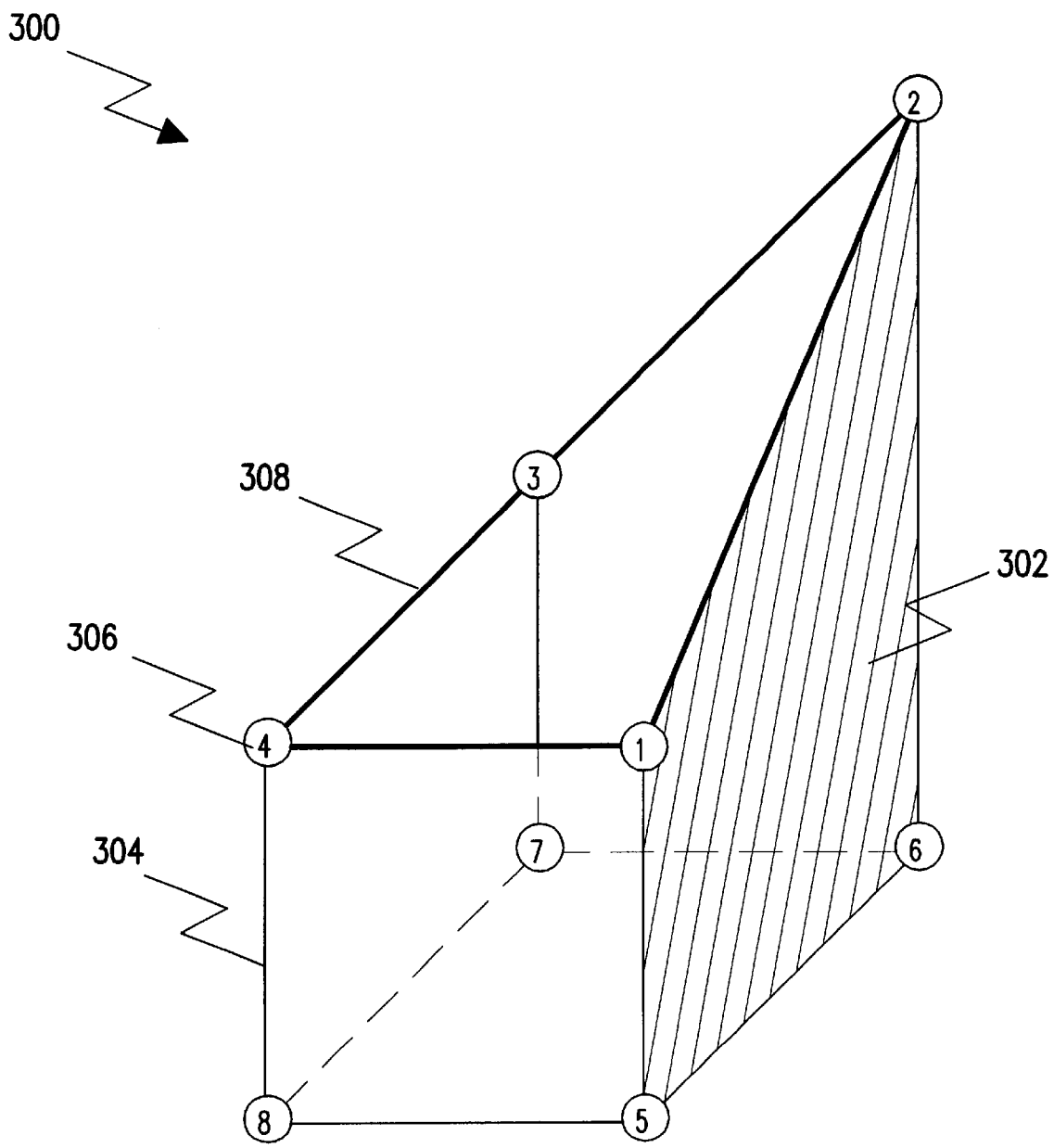
FIG. 3B depicts an example 3-D surface with a defined boundary.

Returning to FIG. 2, in step 204, a surface boundary is defined on 3-D surface 300. The surface boundary is used by the present invention to generate a planar map from 3-D surface 300, as is described in detail below. A surface boundary is a closed path along 3-D surface 300 composed of surface edges 304 and surface vertices 306. In FIG. 3B, four surface edges (4-1, 1-2, 2-3, and 3-4) and four surface vertices (1, 2, 3, and 4) form surface boundary 308, which will be referred to herein as surface boundary 1-2-3-4.

Figure 4A:
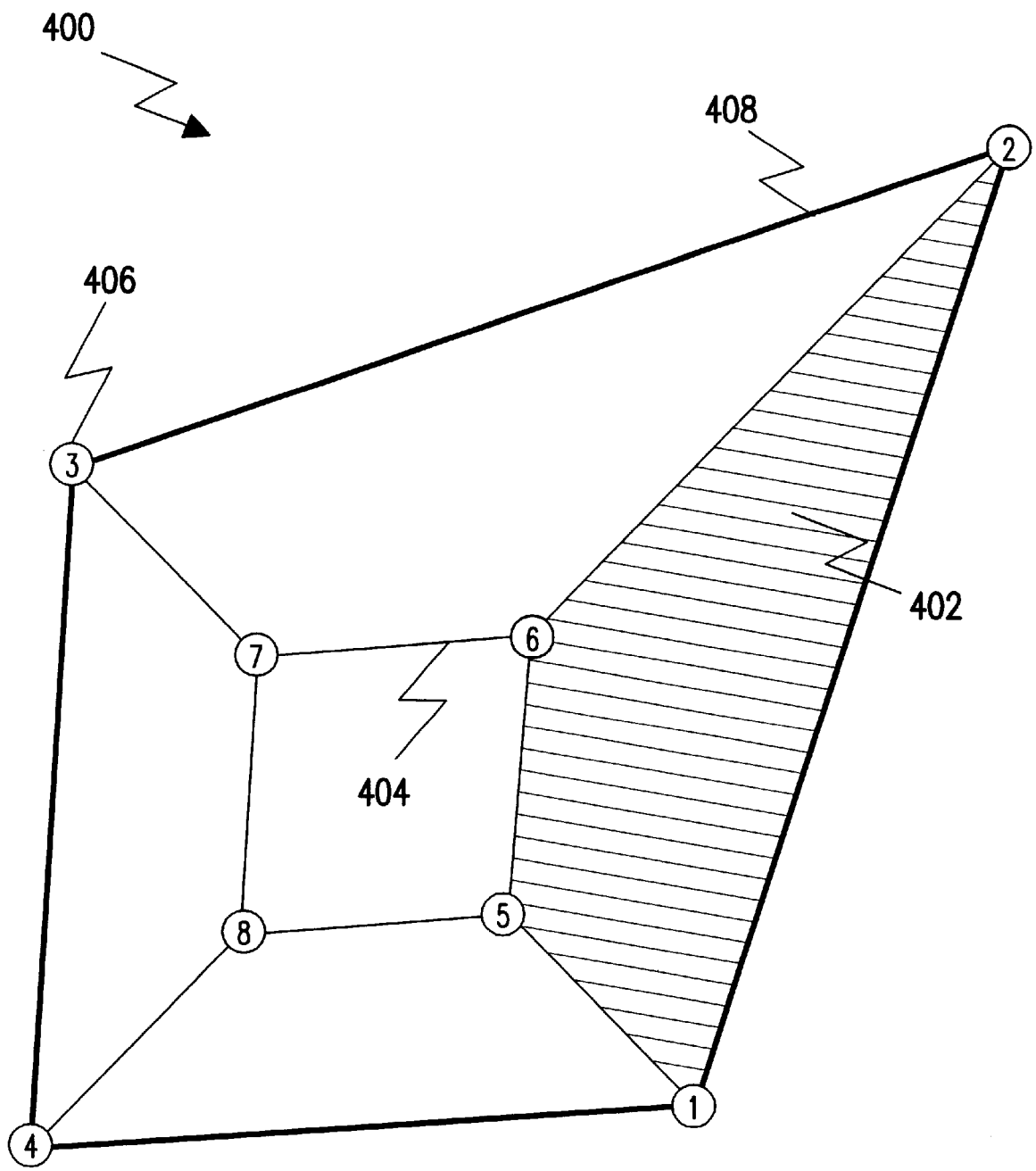
FIG. 4A depicts an example planar map of the example 3-D surface with no cuts.

In step 206, a planar map is generated based on the 3-D surface received in step 202, given the surface boundary defined in step 204. FIG. 4A depicts an example planar map 400. As with 3-D surfaces, planar map 400 includes map primitives 402, map edges 404, map vertices 406, and a map boundary 408 made up of four map edges (1-2, 2-3, 3-4, and 4-1) and four map vertices (1, 2, 3, and 4). However, planar map 400 is defined in two dimensions (i.e., planar map 400 is defined in a single plane) whereas 3-D surface 300 is defined in three dimensions. The same naming conventions described above with respect to 3-D surface 300 will be followed with respect to planar map 400.

Planar map 400 must satisfy the following restrictions: each point on 3-D surface 300 must map to a unique point on planar map 400, and the connectivity of 3-D surface must be maintained in planar map 400. The uniqueness restriction ensures that each element (i.e., vertex, edge, and primitive) of the 3-D surface corresponds in a one-to-one fashion with one element of the planar map. Map vertices 406 correspond in one-to-one fashion with surface vertices 306, map edges 404 correspond to surface edges 304, and so on. For example, map vertex 2 corresponds to surface vertex 2, map edge 2-1 corresponds to surface edge 2-1, map primitive 1-2-6-5 corresponds to surface primitive 1-2-6-5 (both are represented as shaded regions), and map boundary 1-2-3-4 corresponds to surface boundary 1-2-3-4. In order to satisfy this restriction, none of the map primitives 402 may overlap, otherwise the point of overlap would correspond to multiple locations on 3-D surface 300. However, it is not required that shapes or sizes be maintained, i.e., a map edge may be longer or shorter than the corresponding surface edge and a map primitive may be of a different shape and size than the corresponding surface primitive.

It is this one-to-one correspondence that makes planar map 400 a useful representation of 3-D surface 300. Consider an embodiment where planar map 400 represents a region of a texture map for a 3-D graphical surface in a computer graphics system. When planar map 400 satisfies the above restriction, the texture region within map primitive 402 will appear only on the corresponding surface primitive 302, though the texture may be distorted due to any differences in shape between the primitives. Those skilled in the art will recognize additional advantages of ensuring this unique one-to-one correspondence between the 3-D surface and the planar map.

In addition to requiring one-to-one correspondence, planar map 400 must also maintain the connectivity of 3-D surface 300. That is, map edges 404 and map vertices 406 must be interconnected in the same way that the corresponding surface edges 304 and surface vertices 306 are interconnected. For example, in FIG. 3B, surface vertex 4 is connected (via a single surface edge) to surface vertices 1, 3, and 8. Map vertex 4 must therefore be connected (via a single map edge) to map vertices 1, 3, and 8, as shown in FIG. 4A. Again, it is not required that the edges be the same length, nor is it required that the primitives be the same shape.

Returning to FIG. 2, flowchart 200 indicates that program flow proceeds from step 206 back to step 204. According to the current invention, the surface boundary 308 defined in the first iteration of step 204 can be modified in subsequent iterations. Once surface boundary 308 has been modified, a new planar map is generated in step 206. This iteration may be repeated as many times as necessary to achieve a desired planar mapping of the received 3-D surface.

The following sections provide detailed descriptions of steps 204 and 206. Defining the surface boundary is described first, followed by the generation of planar maps.

Defining the Surface Boundary

In step 204, a surface boundary is defined on the 3-D surface. The 3-D surface received in step 202 may have a pre-defined surface boundary, depending on the particular application. Thus, on a first iteration through the method illustrated in flowchart 200, the surface boundary may need to be defined in its entirety (if the 3-D surface has no pre-defined boundary), or user 102 may wish to modify the pre-defined surface boundary if one is present. On subsequent iterations, in step 204 user 102 may modify the surface boundary defined in the previous iteration. Thus, step 204 encompasses specifying surface boundary 308 in its entirety and/or modifying an existing surface boundary 308.

Where a surface boundary must be specified in its entirety, user 102 preferably traces the desired surface boundary 308 directly onto the displayed image of 3-D surface 300 using a mouse, trackball, joystick, or any other appropriate user input device. Those skilled in the art will recognize that standard graphical user interface (GUI) techniques might be employed to implement this tracing function. However, those skilled in the art will also recognize that methods other than manual definition could be used for defining surface boundary 308, such as an automated method which defines surface boundary 308 based on some arbitrary criteria.

Figure 3C:
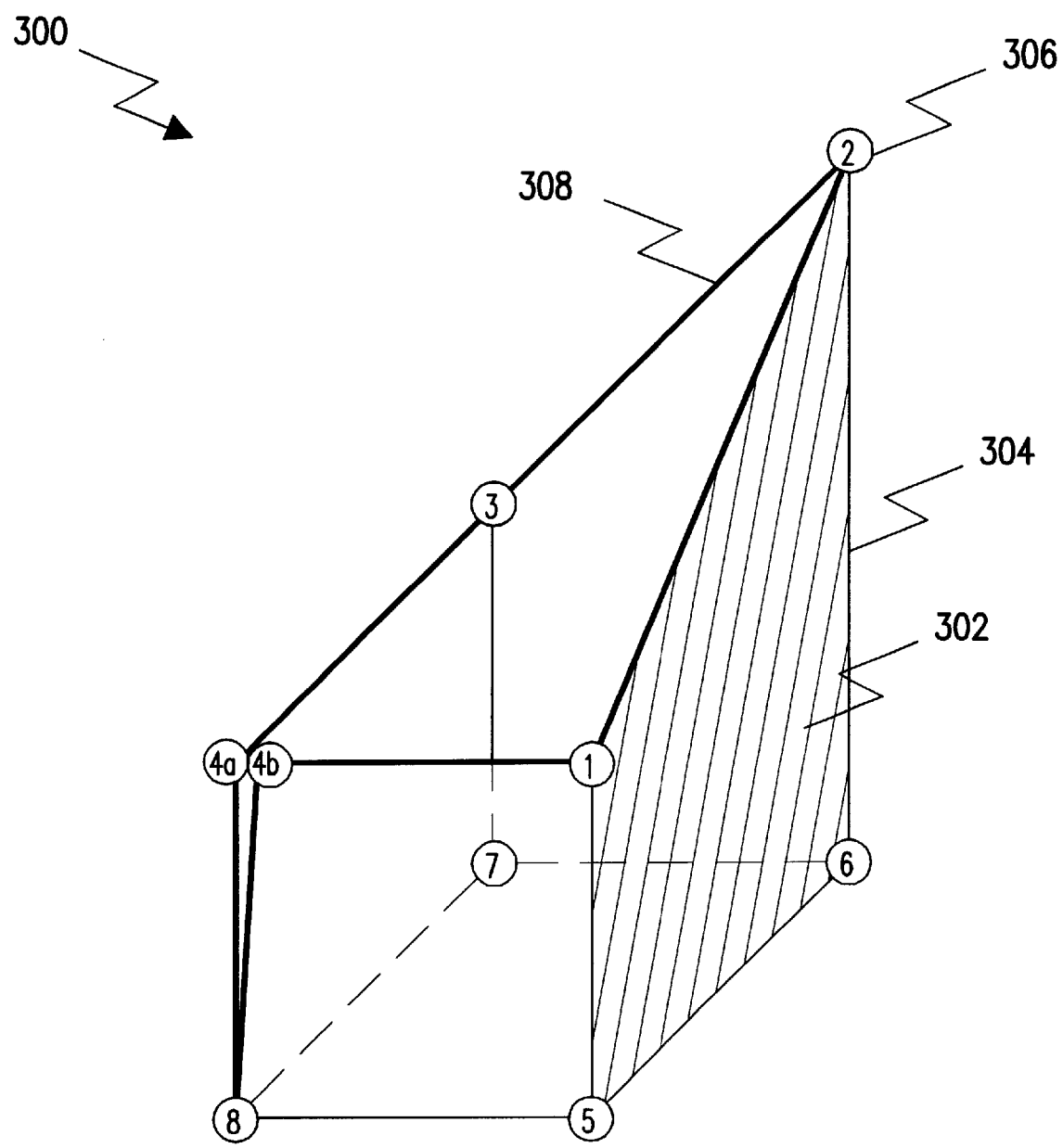
FIG. 3C depicts an example 3-D surface with a modified (cut) boundary.

Once surface boundary 308 has been defined, user 102 thereafter preferably modifies surface boundary 308 using "cutting" and "sewing" operations. Cutting 3-D surface 300 refers to splitting a surface edge adjacent to surface boundary 308, such that the modified surface boundary 308 now traces through the split edge. For example, FIG. 3C depicts 3-D surface 300 with a surface boundary 308 modified by a cutting operation. Here, user 102 has cut 3-D surface 300 from surface vertex 4 to surface vertex 8. Cutting operations will be described herein with reference to the surface vertices through which the cut passes. For example, the cut depicted in FIG. 3C would be described as a cut 4-8.

As a result of the cutting operation, an additional surface vertex and surface edge has been created. Surface vertex 4 has been split into surface vertex 4a and 4b, and two surface edges (4a-8 and 4b-8) now exist where there was only one (4-8). The modified boundary on 3-D surface 300 is now indicated by surface boundary 1-2-3-4a-8-4b. FIG. 3C depicts surface vertices 4a and 4b as being spaced apart for illustrative purposes only. Surface vertices generated as the result of a cutting operation actually occupy the same point in 3-D space, as do the split surface edges.

Sewing refers to an operation which is the opposite of cutting, i.e., user 102 may rejoin surface edges and surface vertices which have been split as the result of a cutting operation. Sewing operations will be also described herein with reference to the affected surface vertices.

Cutting a 3-D surface allows, in many instances, a less distorted planar map to be generated. Consider FIGS. 3B and 4A. Planar map 400 is a 2-D mapping of 3-D surface 300. As can be seen, the shapes of map primitives 402 are distorted as compared to their corresponding surface primitives 302. This distortion is due to the restrictions placed on planar map 400 (i.e., uniqueness and connectivity). Those skilled in the art will recognize the desirability of producing planar maps where each map primitive accurately reflects the shape of the corresponding surface primitive. For example, map primitive 1-2-6-5 (shown as the shaded map primitive in FIG. 4A) would ideally have the same shape as surface primitive 1-2-6-5 (shown as the shaded primitive in FIG. 3B). However, as can be seen, these shapes are similar but not identical. The measure of this difference in shape will be referred to as distortion.

Given the restrictions on planar map 400, it is generally not possible to produce a distortionless planar map of a 3-D surface. Consider 3-D surface 300. Clearly, it is not possible to "flatten out" this open-topped box to a distortionless planar map while maintaining connectivity and one-to-one correspondence. However, it would be possible if one were to cut the box along certain of the edges. The box could then be unfolded and laid flat, while maintaining connectivity and one-to-one correspondence.

FIG. 4B depicts a distortionless planar map 400 generated according to the present invention where user 102 performed the following cuts to 3-D surface 300 in step 204: 4-8, 8-7, 8-5, and 5-6. As shown in FIG. 4B, map boundary 1-4b-8c-5b-6-5a-8b-7-8a-4a-3-2 results from this series of cuts. Now, for example, map primitive 4a-3-7-8a and surface primitive 4-3-7-8 have an identical shape, as do the other four primitives. Those skilled in the art will recognize that further cuts will not further decrease the distortion, as planar map 400 is already distortionless. Connectivity is also maintained, as each cut creates an extra surface vertex and surface edge, which may then be separated and laid flat. Thus, cutting operations in some instances will decrease distortion in planar map 400.

However, distortion is not the only measure of interest. Those skilled in the art will also recognize that the discontinuities introduced by the cuts are not desirable for some applications. In the present context, a discontinuity refers to the situation where the map primitives corresponding to adjoining surface primitives do not adjoin because of a cut. For example, surface primitive 4-3-7-8 adjoins (i.e., shares an edge with) surface primitive 1-4-5-8; however, their corresponding map primitives 4a-3-7-8a and 6-7-8b-5a do not adjoin because of cut 7-8. Planar map 400 has greater discontinuity in FIG. 4B than in FIG. 4A, but less distortion.

This illustrates the fundamental tradeoff between discontinuity and distortion. Cutting 3-D surface 300 increases the discontinuity of planar map 400 but decreases the distortion. Those skilled in the art will recognize that the particular application to which the present invention is applied will determine the appropriate balance between distortion and discontinuity. The iterative approach of the present invention allows user 102 to achieve a desired balance by varying the number of cuts made to 3-D surface 300.

Generation of Planar Maps

Figure 5:
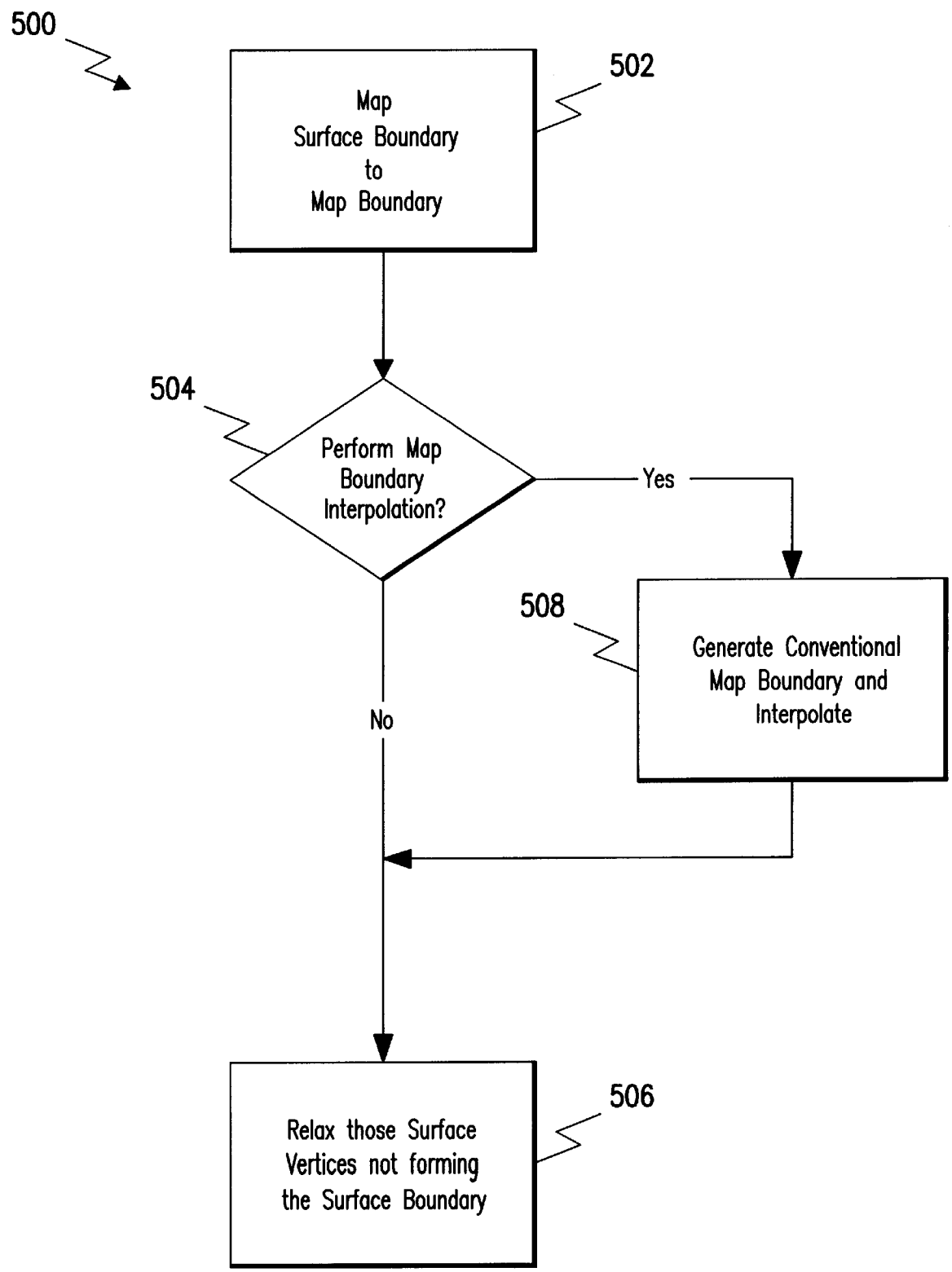
FIG. 5 is a flowchart detailing the generation of planar maps.

Once 3-D surface 300 has been received, and surface boundary 308 defined, a planar map is then generated in step 206. FIG. 5 depicts a flowchart 500 illustrating step 206 in greater detail. Planar map generation is fundamentally a two step process: boundary mapping and relaxation. In step 502, surface boundary 308 (see FIG. 3B), which is defined in three dimensions, is mapped according to the present invention to 2-D map boundary 408 (see FIG. 4A). In step 506, conventional relaxation techniques are then applied to the remainder of the surface vertices (those surface vertices 306 not forming surface boundary 308) to form map vertices 406. These steps are described in detail in the following two sub-sections.

Steps 504 and 508 describe an extension to the basic planar mapping described in steps 502 and 506, whereby the map boundary created in step 502 is interpolated with another map boundary created according to a conventional boundary mapping technique. This extension is discussed in detail below.

Boundary Mapping

Figure 6:
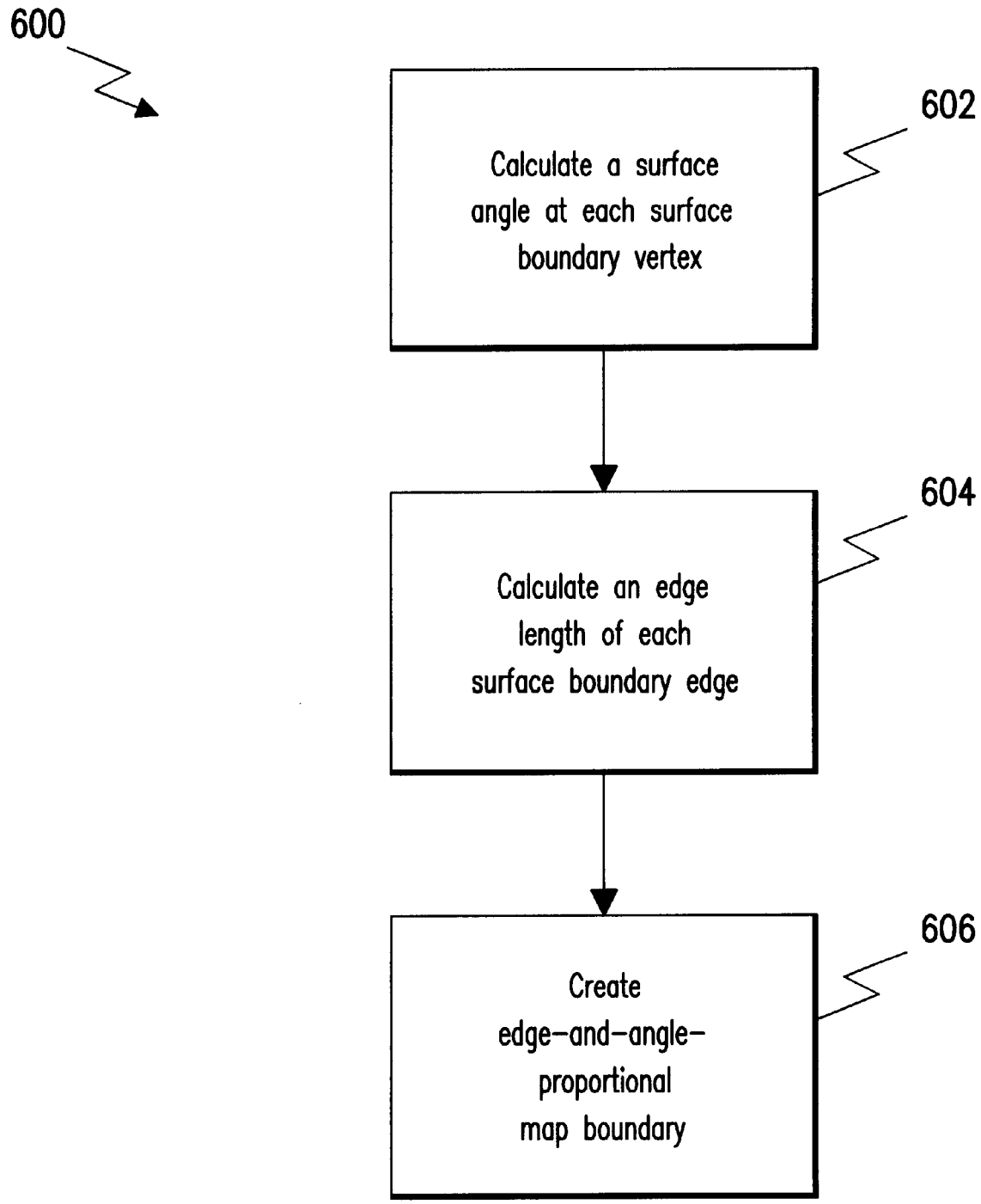
FIG. 6 is a flowchart detailing boundary mapping.

FIG. 6 depicts a flowchart 600 illustrating step 502 (mapping surface boundary 308 to map boundary 408) in greater detail. In step 602, the surface angle is calculated at each surface vertex 306 on surface boundary 308. For example, referring to FIG. 3B, the surface angle is calculated at surface vertices 1, 2, 3, and 4. The surface angle is calculated at each surface vertex 306 by determining the angle between the two boundary edges which meet at the surface vertex, where the angle is calculated traveling along 3-D surface 300.

For example, at surface vertex 4, the surface angle is equal to the angle separating surface edges 1-4 and 3-4 traveling along 3-D surface 300. To calculate the angle traveling along 3-D surface 300, the angle between surface edges 4-1 and 4-8 must be added to the angle between surface edges 4-8 and 3-4. Each of these angles is 90 degrees, so the surface angle at surface vertex 4 is 180 degrees. Similarly, at surface vertex 1, the surface angle is the total of the angle between surface edges 1-4 and 1-5 (90 degrees), and the angle between surface edges 1-5 and 1-2 (135 degrees, totaling 225 degrees). The surface angle at surface vertex 2 is 90 degrees, and 225 degrees at surface vertex 3.

In step 604, the length of each surface edge forming surface boundary 308 is calculated. For example, in FIG. 3B, the length of surface edges 1-4, 1-2, 2-3, and 3-4 are calculated.

In step 606, map boundary 408 is created, where the planar angle at each map vertex 406 along map boundary 408 is proportional to the surface angle at the corresponding surface vertex 306. Similarly, the length of each map edge along map boundary 408 is proportional to the length of the corresponding surface edge along surface boundary 308. Step 606 is therefore called an "edge-and-angle proportional" mapping.

The term "proportional" as used herein indicates approximate proportionality by a factor common to all the planar/surface angle relationships, $k_a$, and a factor common to all the map/surface edge relationships, $k_e$. For example, the planar angle at map vertex 4 is approximately equal to $k_a$ times the surface angle at surface vertex 4, the planar angle at map vertex 1 is approximately equal to $k_a$ times the surface angle at surface vertex 1, and so on for the remainder of the corresponding planar/surface angle relationships along map boundary 408. Similarly, the length of map edge 3-4 is approximately equal to $k_e$ times the length of surface edge 3-4, the length of map edge 4-1 is approximately equal to $k_e$ times the length of surface edge 4-1, and so on for the remainder of the corresponding map/surface edge relationships along map boundary 408.

Figure 7:
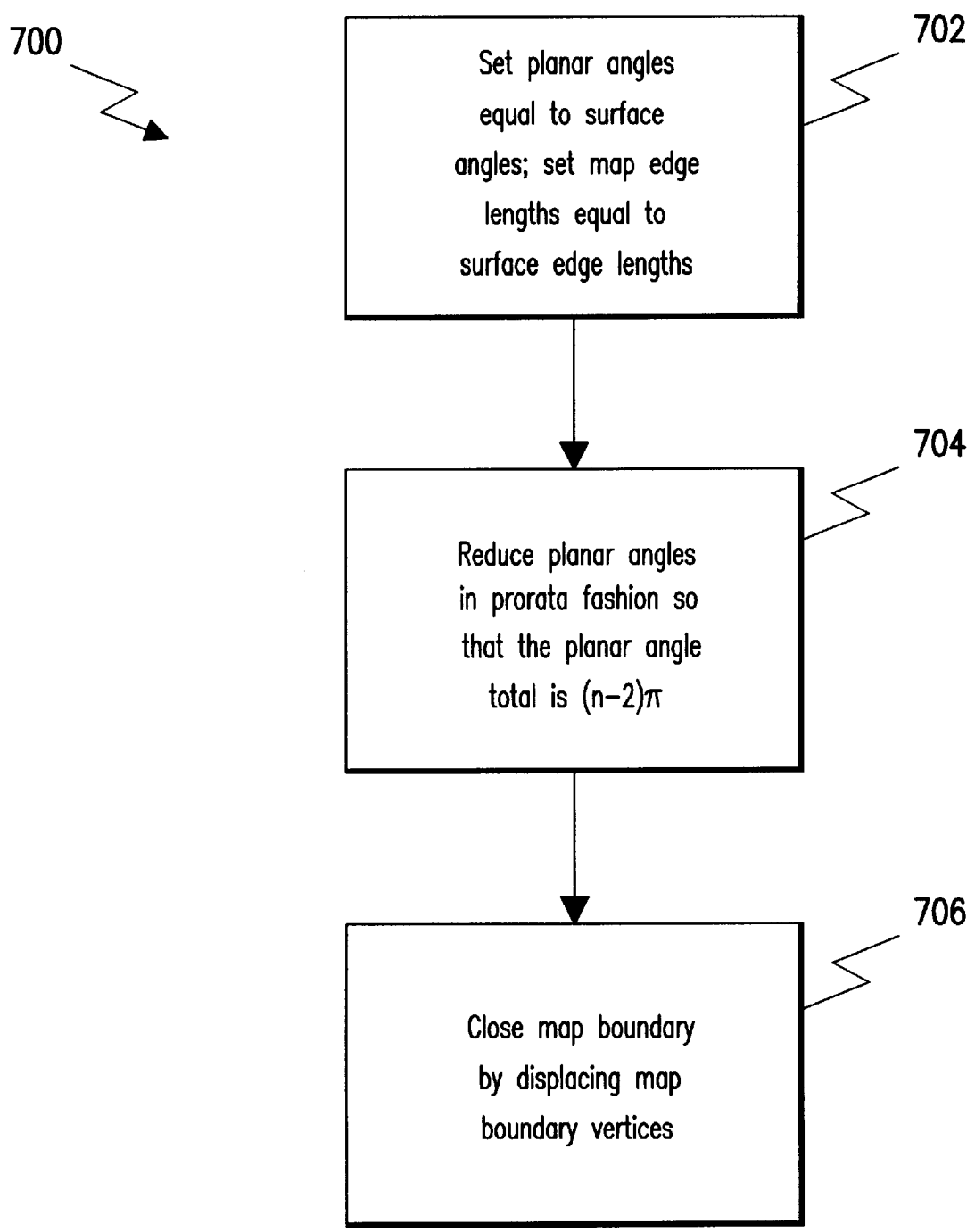
FIG. 7 is a flowchart detailing a preferred embodiment of an edge-and-angle proportional boundary mapping.

Those skilled in the art will recognize that various approaches might be followed for calculating planar angles and map edge lengths which are proportional to surface angles and surface edge lengths. FIG. 7 depicts a flowchart 700 which illustrates a preferred edge-and-angle proportional mapping method. Reference will also be made to FIGS. 8A–8D which graphically illustrate these operations on surface boundary 308 as defined in FIG. 3B. Note that these illustrations are meant for explanatory purposes only—in a preferred embodiment, the calculations take place within computer system 104 and only the final result (FIG. 8D) is displayed to user 102.

Figure 8A:
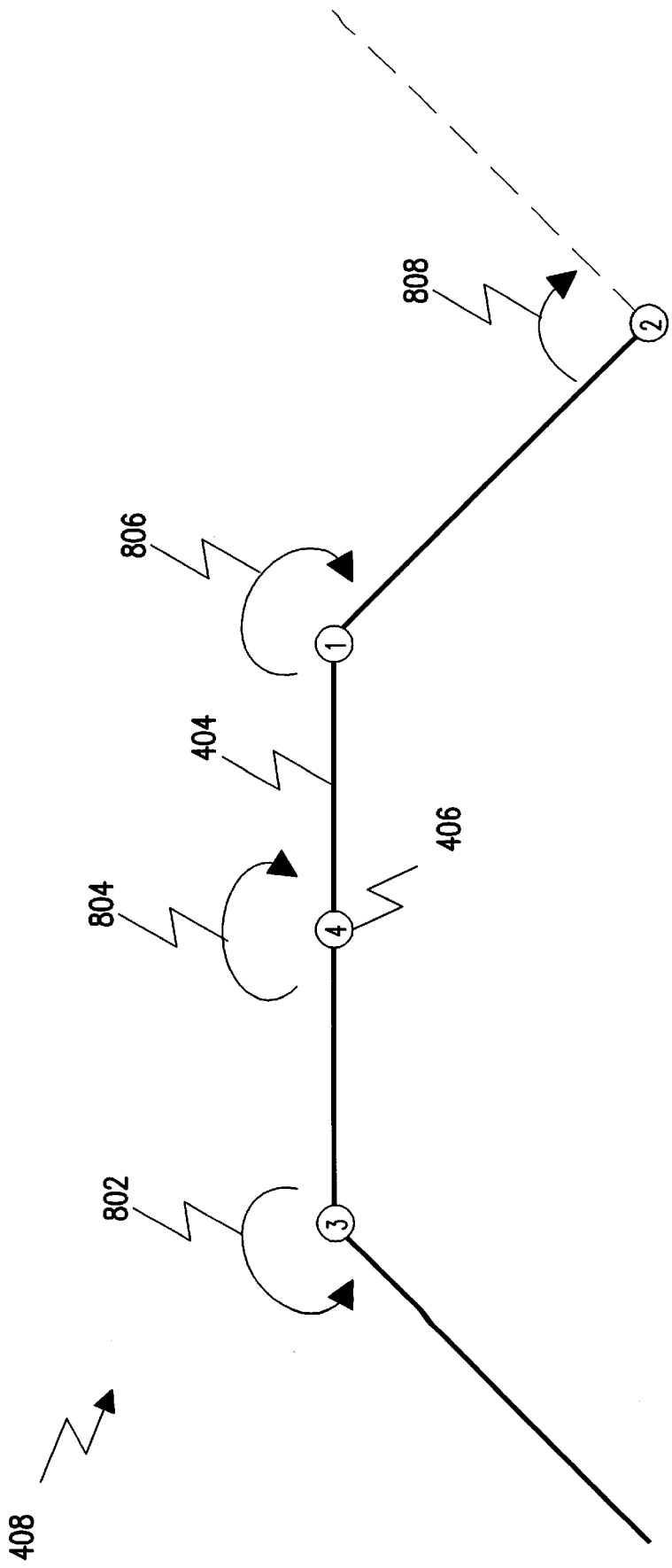
FIG. 8A illustrates a first step in a preferred embodiment of an edge-and-angle proportional boundary mapping.

In step 702, the planar angles of map boundary 408 are set equal to the corresponding surface angles calculated in step 602, and the map edge lengths of map boundary 408 are set equal to the corresponding edge lengths calculated in step 604. FIG. 8A depicts map boundary 408 at this stage of the edge-and-angle proportional mapping. The planar angle at each map vertex 406 is the angle between the two map edges 404 which meet at the map vertex in the plane in which map boundary 408 is defined. For example, map vertex 3 has a planar angle 802 as shown in FIG. 8A. Planar angle 802 is set equal to the surface angle calculated at surface vertex 3, i.e., 225 degrees. Planar angle 808 indicates the angle between map edges 1-2 and 2-3—the dashed line indicates the angular position of map edge 2-3 relative to map edge 1-2—which is set equal to the surface angle calculated at surface vertex 2, i.e., 90 degrees.

Figure 8B:
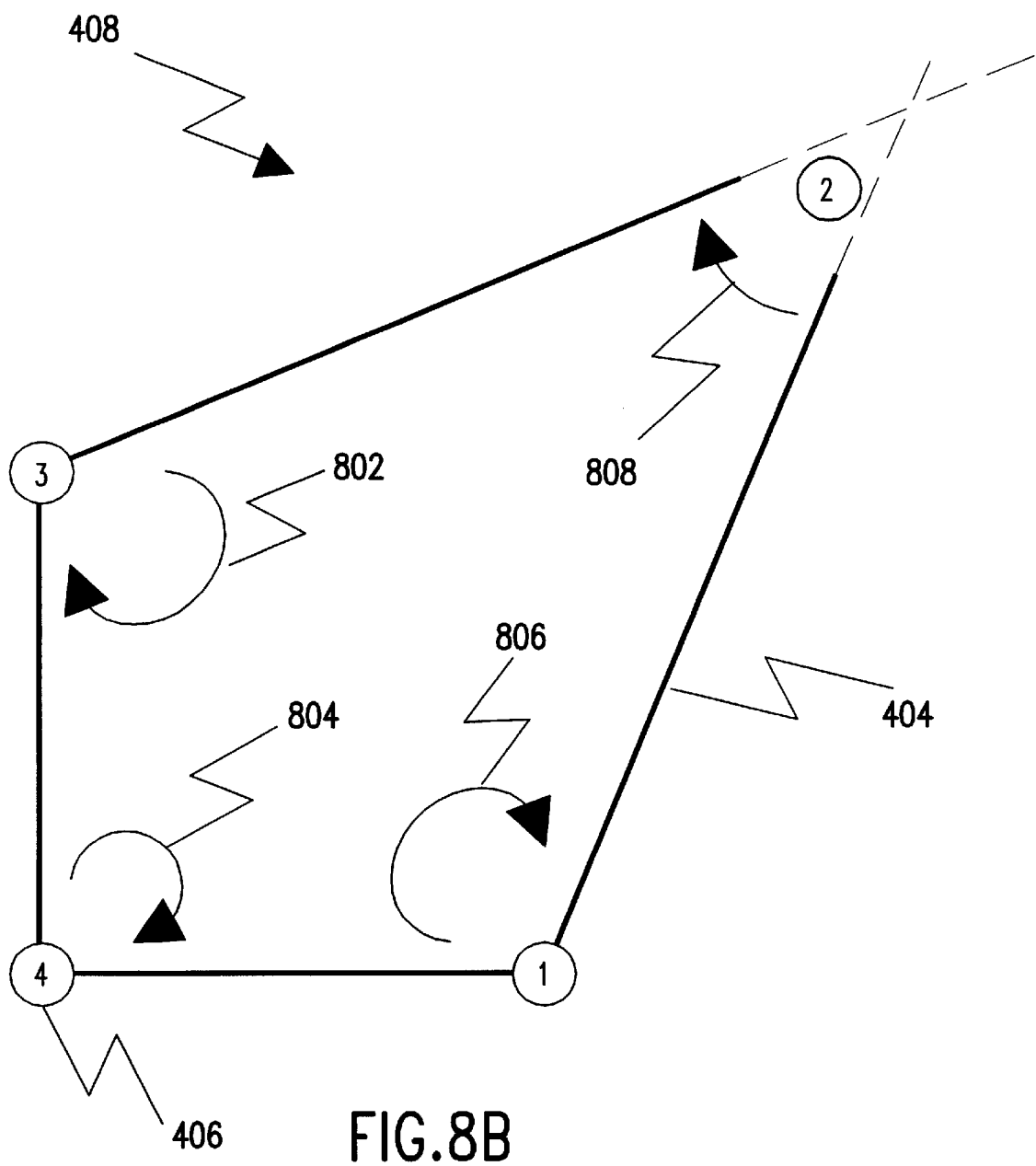
FIG. 8B illustrates a second step in a preferred embodiment of an edge-and-angle proportional boundary mapping.

In step 704, the planar angles of map boundary 408 are adjusted in prorata fashion so that their sum is $\pi(n-2)$, where n is the number of map edges forming map boundary 408. The appropriate angle proportionality factor, $k_a$, for achieving this angle sum is computed according to the following equation:

$$k_a = \frac{\pi(n-2)}{\alpha_{tot}}$$

where $\alpha_{tot}$=sum of planar angles on map boundary The planar angle at each map vertex along map boundary 408 is multiplied by $k_a$; proportionality, as described above, is therefore maintained. FIG. 8B depicts map boundary 408 after planar angles 802, 804, 806, and 808 have been adjusted. Note that at this step in the mapping, the map edge lengths along map boundary 408 are equal to the corresponding surface edge lengths, and are therefore proportional (i.e., $k_e$=1).

In FIG. 8B, note that map boundary 408 remains open. As noted above, one constraint on boundaries, both surface and map, is that they be closed. Therefore, in step 706, map vertices 406 are appropriately displaced so as to close map boundary 408. According to the present invention, map vertices 406 are displaced in a computationally efficient manner while maintaining edge and angle proportionality.

Figure 8C:
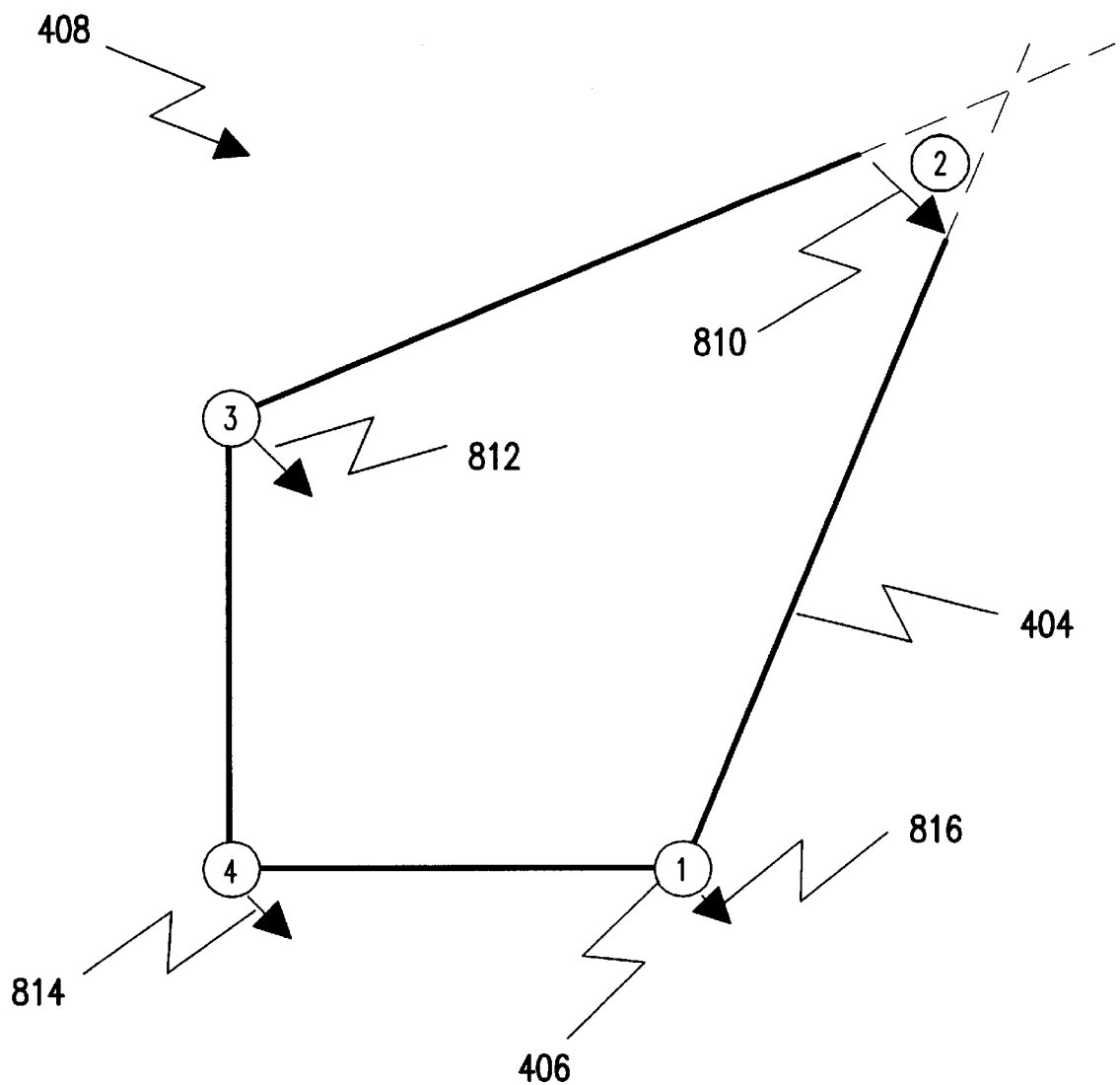
FIG. 8C illustrates a third step in a preferred embodiment of an edge-and-angle proportional boundary mapping.
Figure 8D:
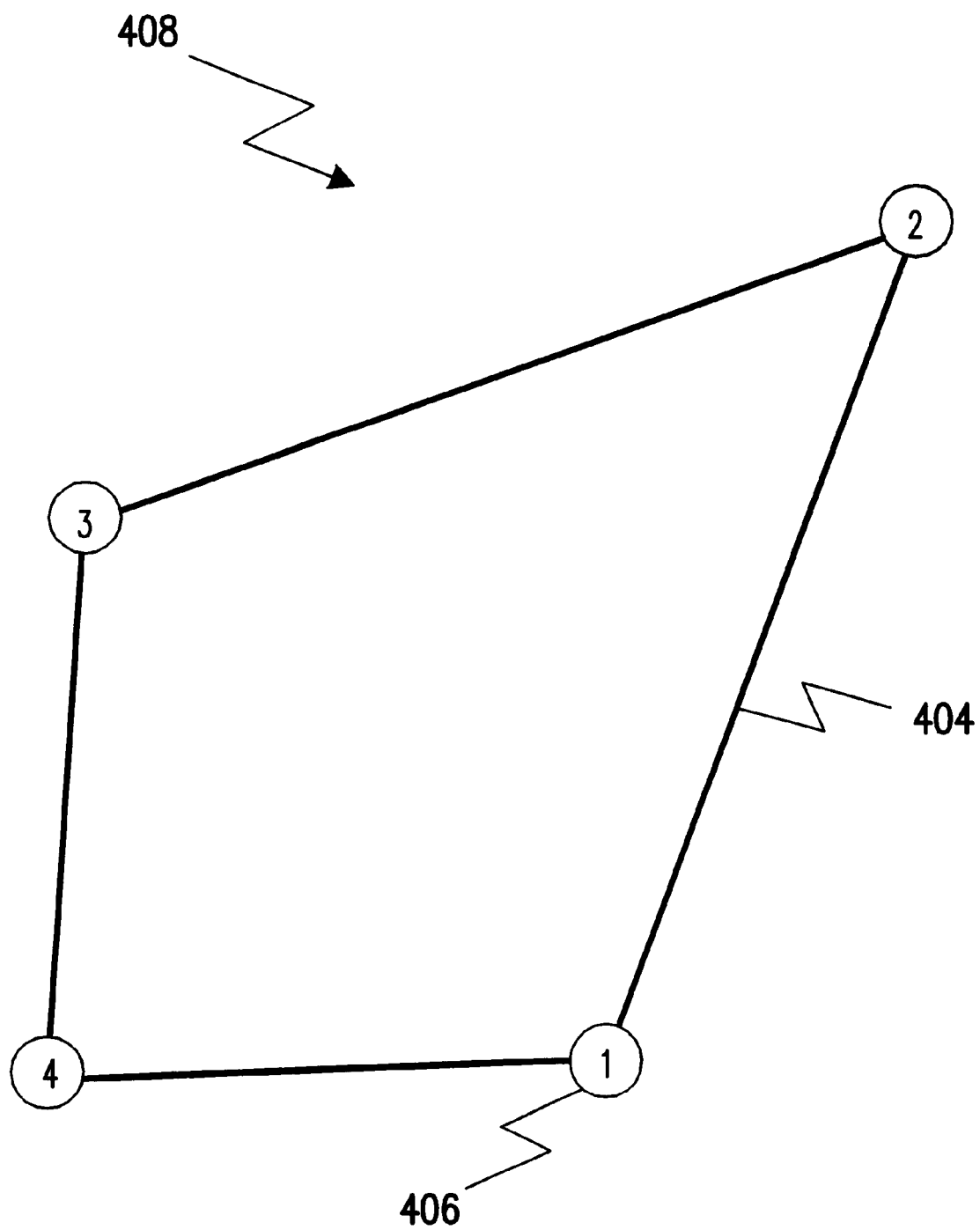
FIG. 8D depicts a map boundary generated according to a preferred embodiment of an edge-and-angle proportional boundary mapping.

In a preferred embodiment, each map vertex 406 is displaced in the same direction, by an amount determined by the position of the vertex on map boundary 408. Referring to FIG. 8C, map boundary 408 is shown as being open at map vertex 2 (shown between map edges 3-2 and 1-2, though by definition map vertex 2 only exists at the intersection of these two map edges). Map boundary 408 is closed by displacing the end of map edge 3-2 (at map vertex 2) according to a displacement vector 810. The magnitude and direction of displacement vector 810 are equal to the magnitude and direction of the displacement necessary to close map boundary 408. As shown in FIG. 8D, map vertex 2 is now properly displayed at the juncture of map edges 3-2 and 1-2.

The remainder of the map vertices on map boundary 408 are also displaced. In a preferred embodiment, each displacement vector is calculated according to the following formula:

$$\overline{D}_i = \left(\frac{L_i}{L_{tot}}\right)\overline{D}$$

where  $\overline{D}_i$  displacement vector at $i$th map vertex
$\overline{D}$  displacement vector at map boundary opening
$L_i$  length of map boundary at $i$th map vertex
$L_{tot}$  total length of map boundary Referring to FIG. 8C, $\overline{D}$ is illustrated as displacement vector 810 (the displacement necessary to close map boundary 408), $\overline{D}_1$ is illustrated as displacement vector 816, $\overline{D}_4$ is illustrated as displacement vector 814, and $\overline{D}_3$ is illustrated as displacement vector 812.

The remaining map vertices (3, 4, and 1) are displaced according to displacement vectors given by the above formula. $L_{tot}$ is the total length of map boundary 408 (i.e., sum of the length of map edges 1-2, 1-4, 4-3, and 3-2). $L_i$ is the length along map boundary 408 where map vertex i (i.e., the map vertex for which a displacement vector is being calculated) is positioned. For example, at map vertex 3, $L_3$ is equal to the sum of the length of map edges 1-2, 1-4, and 4-3. This sum is divided by the total length of map boundary 408 and multiplied by $\overline{D}$ to determine $\overline{D}_3$ (displacement vector 812). At map vertex 4, $L_4$ is equal to the sum of the length of map edges 1-2 and 1-4. This sum is divided by the total length of map boundary 408 and multiplied by $\overline{D}$ to determine $\overline{D}_4$ (displacement vector 814).

FIG. 8D depicts map boundary 408 after the map vertices have been displaced according to displacement vectors 810, 812, 814, and 816, as shown in FIG. 8C. As required, map boundary 408 is now closed. Those skilled in the art will recognize that many different approaches might be taken to close map boundary 408, and still achieve the same effect of maintaining edge and angle proportionality while minimizing computational costs. This closing of map boundary 408 completes step 706 in FIG. 7, step 606 in FIG. 6, and step 502 in FIG. 5.

Those skilled in the art will also recognize that alternative approaches exist for creating an edge-and-angle proportional boundary in step 606. One alternative approach is to simulate a system of rods whose lengths are proportional to the surface edge lengths. Each adjacent pair of rods is connected with an angular spring whose rest angle is the surface angle, and which delivers a force proportional to the departure from that angle. The simulated system is allowed to relax while constrained to a plane. The resulting configuration of rods is the map boundary.

Relaxation & Pinning

Returning to FIG. 5, now that surface boundary 308 has been mapped to map boundary 408, in step 506 a conventional relaxation technique is applied to the remainder of the surface vertices 306, i.e., those surface vertices 306 not on surface boundary 308. Relaxation techniques are well known to those skilled in the art, such as the techniques described in Matthias Eck et al., "Multiresolution Analysis of Arbitrary Meshes," Computer Graphics (SIGGRAPH '95 Proceedings), 1995, pp. 175–76 (ACM-0-89791-701-4/95/ 008), which is incorporated herein by reference. Relaxation may be analogized to a configuration of springs with one spring placed along each surface edge 304 not on surface boundary 308. Surface boundary 308 is treated like a rigid framework within which surface vertices 306 are then allowed to relax, forming map vertices 406 in their rest position (i.e., the position of minimum energy).

Referring to example 3-D surface 300 in FIG. 3B, and example planar map 400 in FIG. 4A, a conventional relaxation technique is applied to surface vertices 5, 6, 7, and 8 to form the corresponding map vertices 5, 6, 7, and 8. FIG. 4A depicts a likely result of applying a conventional relaxation technique to surface vertices 5, 6, 7, and 8.

Figure 9:
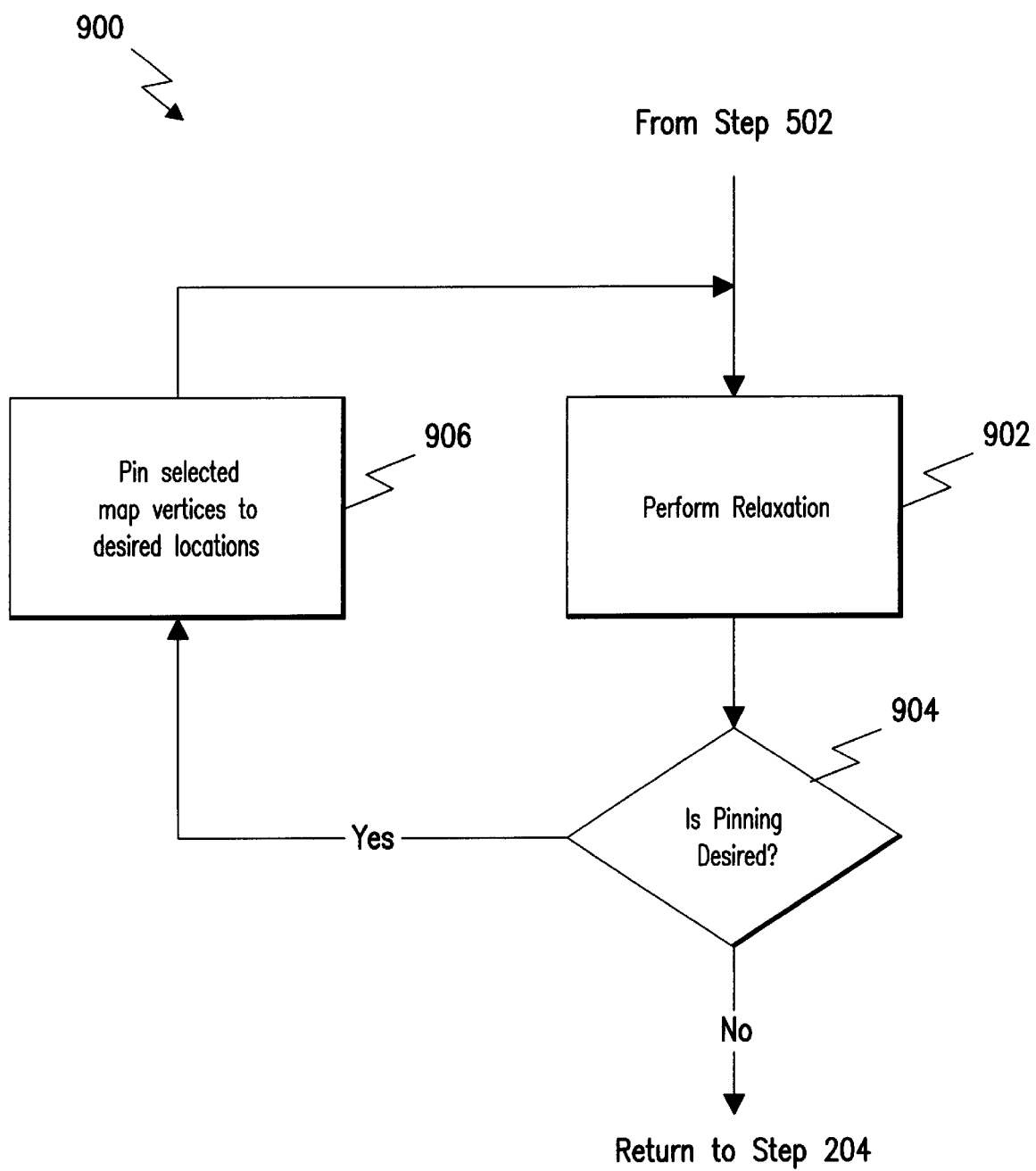
FIG. 9 is a flowchart detailing relaxation and pinning.

FIG. 9 is a flowchart 900 which illustrates step 506 in further detail. Once surface boundary 308 has been mapped to map boundary 408 in step 502, a relaxation technique is applied to those surface vertices not on the surface boundary in step 902 (as described above), forming those map vertices 406 not on map boundary 408.

According to a preferred embodiment, in step 904 user 102 has the option of performing a "pinning" operation. If user 102 desires to perform a pinning operation, program flow continues to step 906. Otherwise, program flow returns to step 204 in FIG. 2, where user 102 is once again able to define surface boundary 308.

In step 906, user 102 selects one or more map vertices and pins them to a particular location(s). Pinning refers to modifying the position (in the 2-D plane in which the planar map is defined) of the selected map vertices 406 and fixing the new position so that when the relaxation technique is again applied in step 902, the "pinned" map vertices are held in place. As a result, those map vertices which are pinned, like those which are on map boundary 408, are treated like a rigid framework and the remainder of the map vertices are allowed to relax.

Figure 10A:
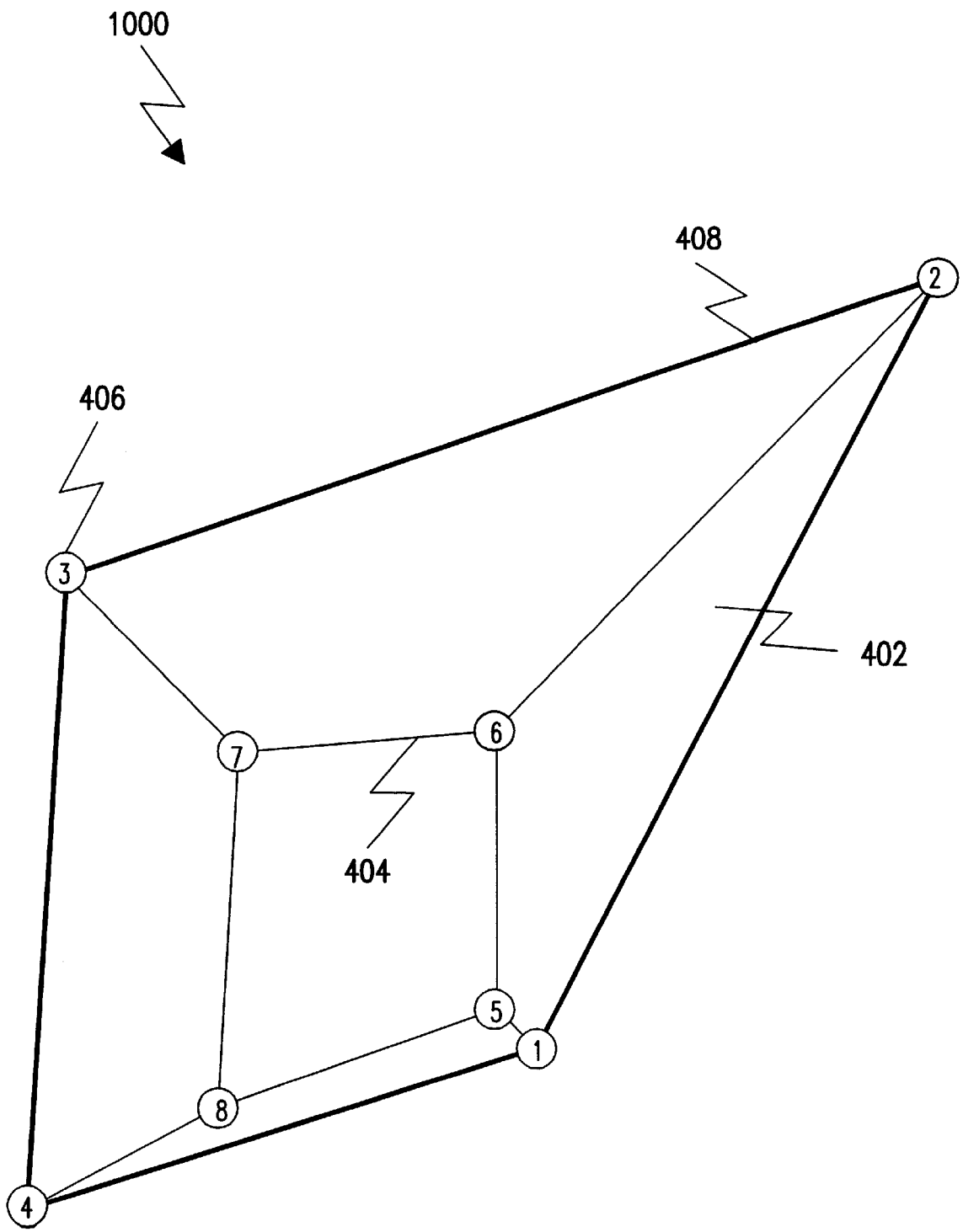
FIG. 10A depicts an example planar map with a distorted map primitive.

FIG. 10A depicts an example planar map 1000 which will be used to illustrate the pinning operation. For purposes of this example, assume that a surface boundary (not shown) defined on a 3-D surface (not shown) was mapped to map boundary 408 (as shown in FIG. 10A) in step 502. Assume further that a relaxation technique was applied in step 902 to those surface vertices not on the surface boundary, forming map vertices 5, 6, 7, and 8. Those skilled in the art will recognize that, for many purposes, map primitive 1-5-8-4 might be of little use given its small size. For example, assume that planar map 1000 represents a texture map in a computer graphics system, and that map primitive 1-5-8-4 is too small to be useful and is a distorted representation of the corresponding surface primitive 1-5-8-4 (not shown). User 102 may manually correct for these problems using pinning.

Figure 10B:
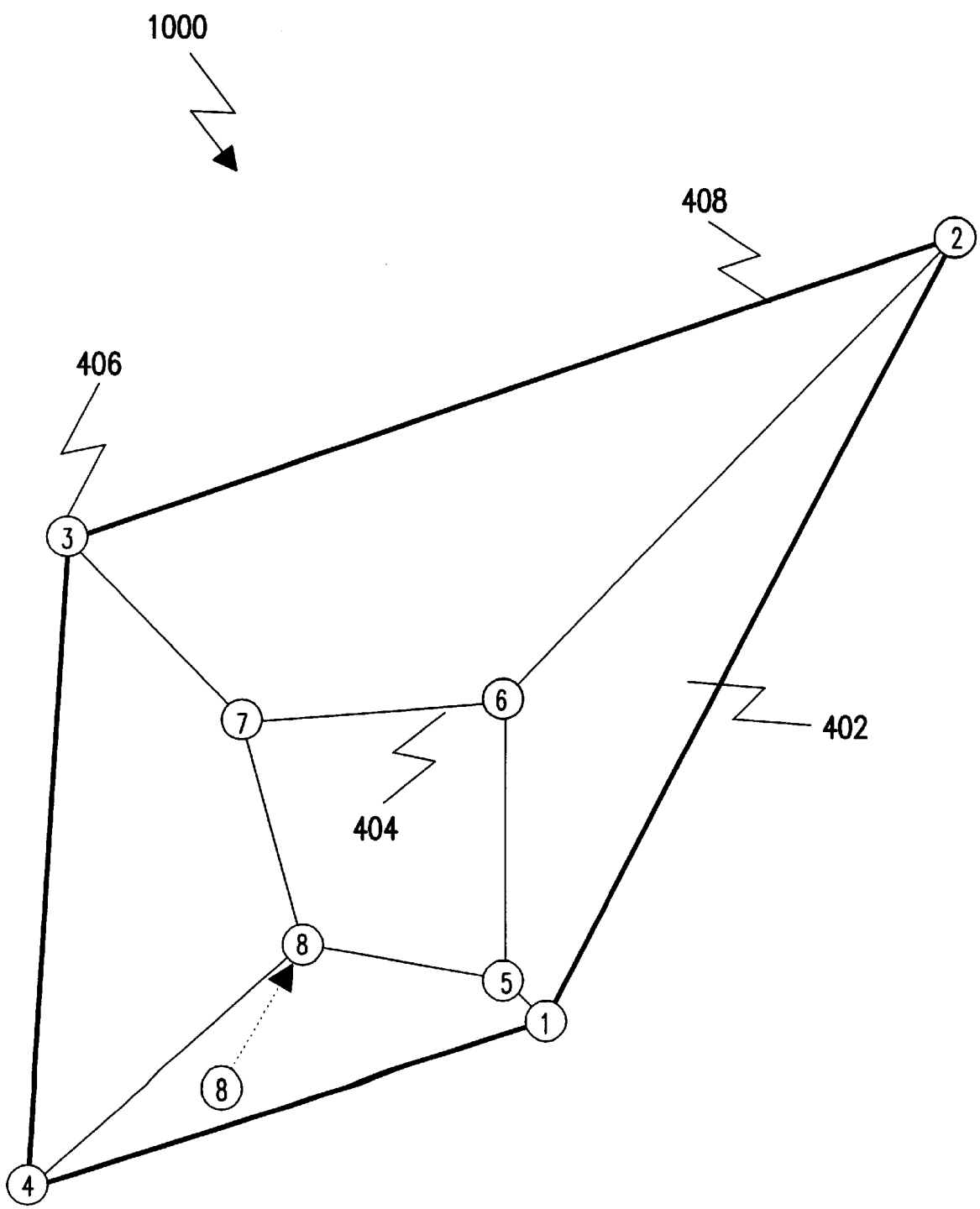
FIG. 10B depicts an example planar map after a map vertex has been moved and pinned.

According to a preferred embodiment, user 102 uses a pointing device (e.g., mouse, joystick, trackball) available with computer system 104 to "drag" map vertex 8 to a new position, such that the redefined map primitive 1-5-8-4 is less distorted and has an increased area. As shown in FIG. 10B, user 102 has dragged map vertex 8 to a new position. Now, map primitive 1-5-8-4 has a larger area and, presumably, is more representative of surface primitive 1-5-8-4 (i.e., less distortion).

Map vertex 8 has now been pinned to the new location shown in FIG. 10B. When program flow again returns to step 902 (after all pinning is complete), a relaxation technique is applied to map vertices 5, 6, and 7, which will likely relax to a new configuration (depending on the particular configuration and relaxation technique used). Map vertices 1,2,3, and 4 are held rigid because they are on map boundary 408, and map vertex 8 is held rigid because it has been pinned.

Program flow continues back to step 904, where user 102 again has the option to perform additional pinning. In this manner, user 102 may continue altering planar map 1000 until a desired result is achieved. Those skilled in the art will recognize the advantages of this approach, particularly given extremely complex planar maps with thousands of map vertices. Often, it is desirable to iteratively modify these complex planar maps by pinning key map vertices and relaxing the rest, until each map primitive has an acceptable shape and size.

Map Boundary Interpolation

The edge-and-angle proportional mapping method described above can generate planar maps having undesirable qualities. For example, the aforementioned methods can generate a map boundary which crosses itself ("self-crossing" boundary). Self-crossing map boundaries are undesirable because it is no longer true that all points on a 3-D surface map to a unique point on the planar map-the self-crossing map boundary creates an overlap region where a single point on the planar map corresponds to two or more points on the 3-D surface. Another example of an undesirable planar map is one that contains areas which are unacceptably distorted. Those skilled in the art will recognize other instances where the aforementioned methods produce undesirable planar maps.

Returning to FIG. 5, steps 504 and 508 describe an extension to the mapping methods described above whereby the map boundary generated in step 502 is interpolated with a different map boundary generated according to a conventional boundary mapping technique. This interpolation can alleviate some of the undesirable effects mentioned above.

Alternatively, the interpolation described in steps 504 and 508 can be used even where the aforementioned methods generated an acceptable planar map to provide an alternate, possibly superior in some respect(s), planar map.

Figure 11A:
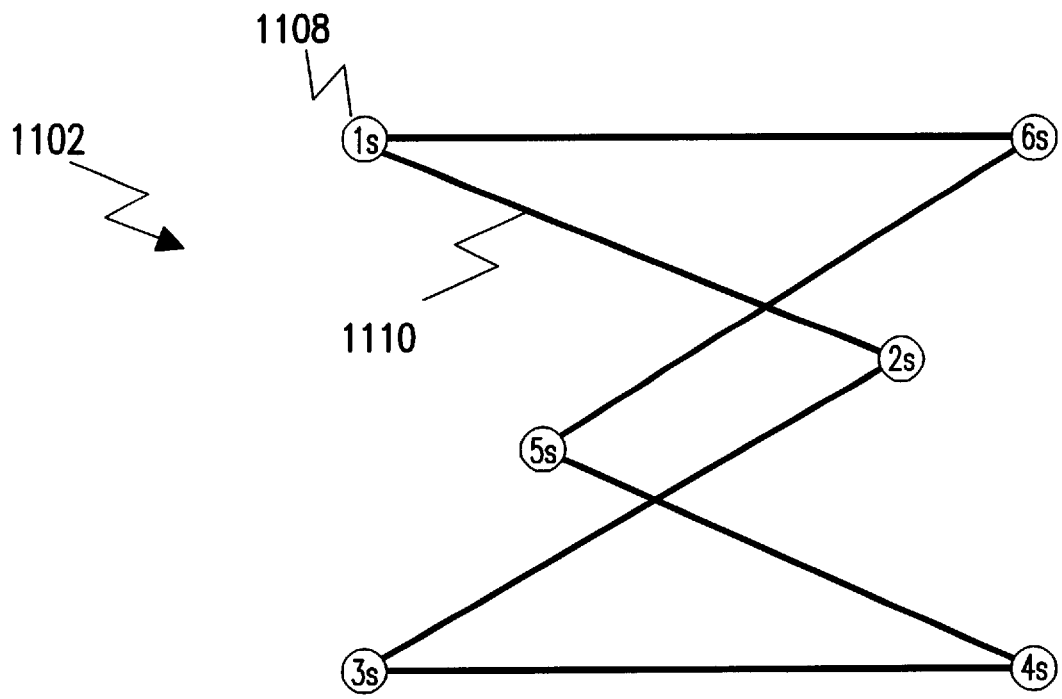
FIG. 11A depicts an example self-crossing map boundary generated according to a preferred embodiment of an edge-and-angle proportional boundary mapping (source boundary)

For purposes of illustration, assume that step 502 has created a self-crossing map boundary, as depicted in FIG. 11A, based on a 3-D surface (not shown) with a defined surface boundary. Map edge 1s-2s crosses map edge 5s-6s and map edge 2s-3s crosses map edge 4s-5s. This map boundary will be referred to as the source map boundary 1102.

In step 504, program flow continues on to step 508 where interpolation is to be performed, or to step 506 where the interpolation is not to be performed. In a preferred embodiment, user 102 determines whether or not map boundary interpolation will be performed. Those skilled in the art will recognize that this determination could also be made automatically. For example, in an alternate embodiment interpolation is automatically performed whenever a self-crossing boundary is detected (according to conventional numerical techniques).

Figure 12:
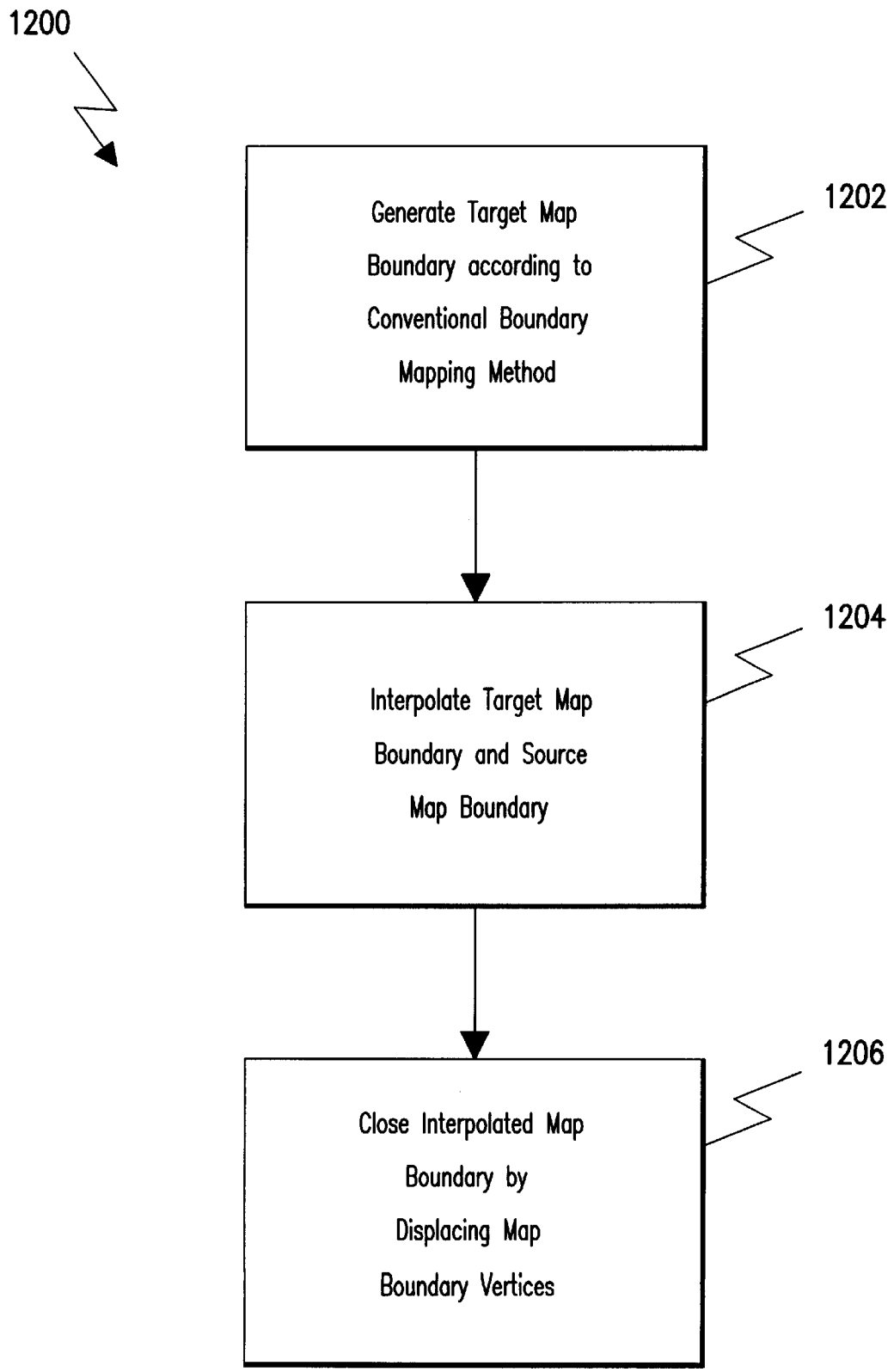
FIG. 12 is a flowchart detailing the map boundary interpolation method.

In those instances where map boundary interpolation is to be performed, program flow proceeds to step 508. FIG. 12 is a flowchart illustrating step 508 in greater detail. In step 1202, another planar map is generated according to a conventional boundary mapping method.

Any conventional boundary mapping method may be used in step 1202. For example, an edge proportional boundary mapping method can be used. Edge proportional methods map the surfaces vertices on the surface boundary to the perimeter of a pre-selected geometric shape in proportion to the length of the surface edges forming the surface boundary. Edge proportional methods produce map boundaries which are convex, a property which is particularly useful, for example, when the interpolation is used to correct for a self-crossing map boundary generated in step 502, as will be described below. Convex boundaries, by definition, do not self-cross.

Figure 11B:
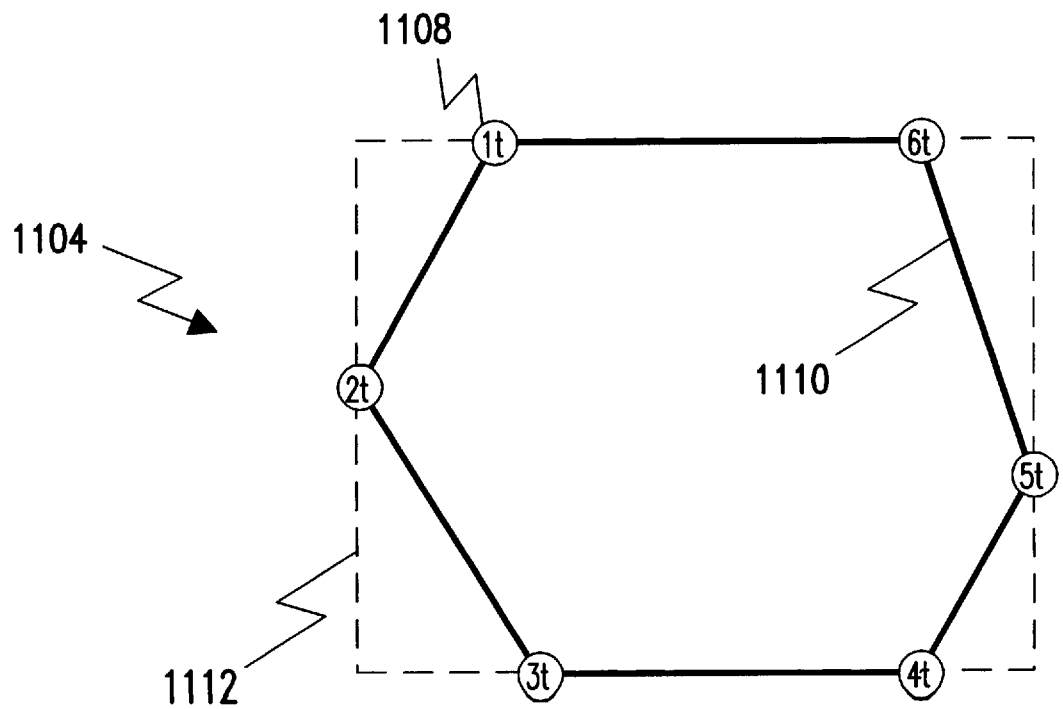
FIG. 11B depicts an example map boundary generated according to an edge-proportional boundary mapping (target boundary)

For purposes of illustration, assume that an edge proportional method is used in step 1202. FIG. 11B depicts an example map boundary generated by applying an edge proportional method to the same 3-D surface used to generate source map boundary 1102. In a preferred embodiment, the pre-selected geometric shape is a rectangle 1112, though other shapes may be used. All of the surface vertices on the surface boundary are mapped onto rectangle 1112. The distance between them, measured along the rectangle perimeter, is proportional to the length of the surface edge connecting the vertices-the resulting map boundary is therefore "edge proportional."

These distances are calculated by multiplying the total length of the rectangle perimeter by the length of the surface edge, and dividing that product by the total length of the surface boundary. Once map vertices 1108 are placed, they are connected to form map edges 1110. For example, in FIG. 11B map vertices 1108 are first placed along rectangle 1112, where the distances between map vertices 1108 are calculated as described above. Once map vertices 1108 are placed, map edges 1110 are created in "connect-the-dots" fashion. This map boundary will be referred to as the target map boundary 1104.

In step 1204, source map boundary 1102 and target map boundary 1104 are interpolated to form a new map boundary. According to a preferred embodiment, the interpolation is computed as follows:

$$new\_angle_i = source\_angle_i(1-\alpha) + target\_angle_i * \alpha$$

$$new\_length_i = source\_length_i(1-\alpha) + target\_length_i * \alpha$$

The interpolation parameter $\alpha$ controls the relative weight accorded source map boundary 1102 and target map boundary 1104. The source and target map boundaries have the same number of map vertices (and map edges) because they were generated using the 3-D surface and surface boundary. Referring to FIGS. 11A and 11B, source map boundary 1102 has six map vertices 1s to 6s and target map boundary 1104 map vertices 1t to 6t("s" and "t" designate source and target).

Figure 11C:
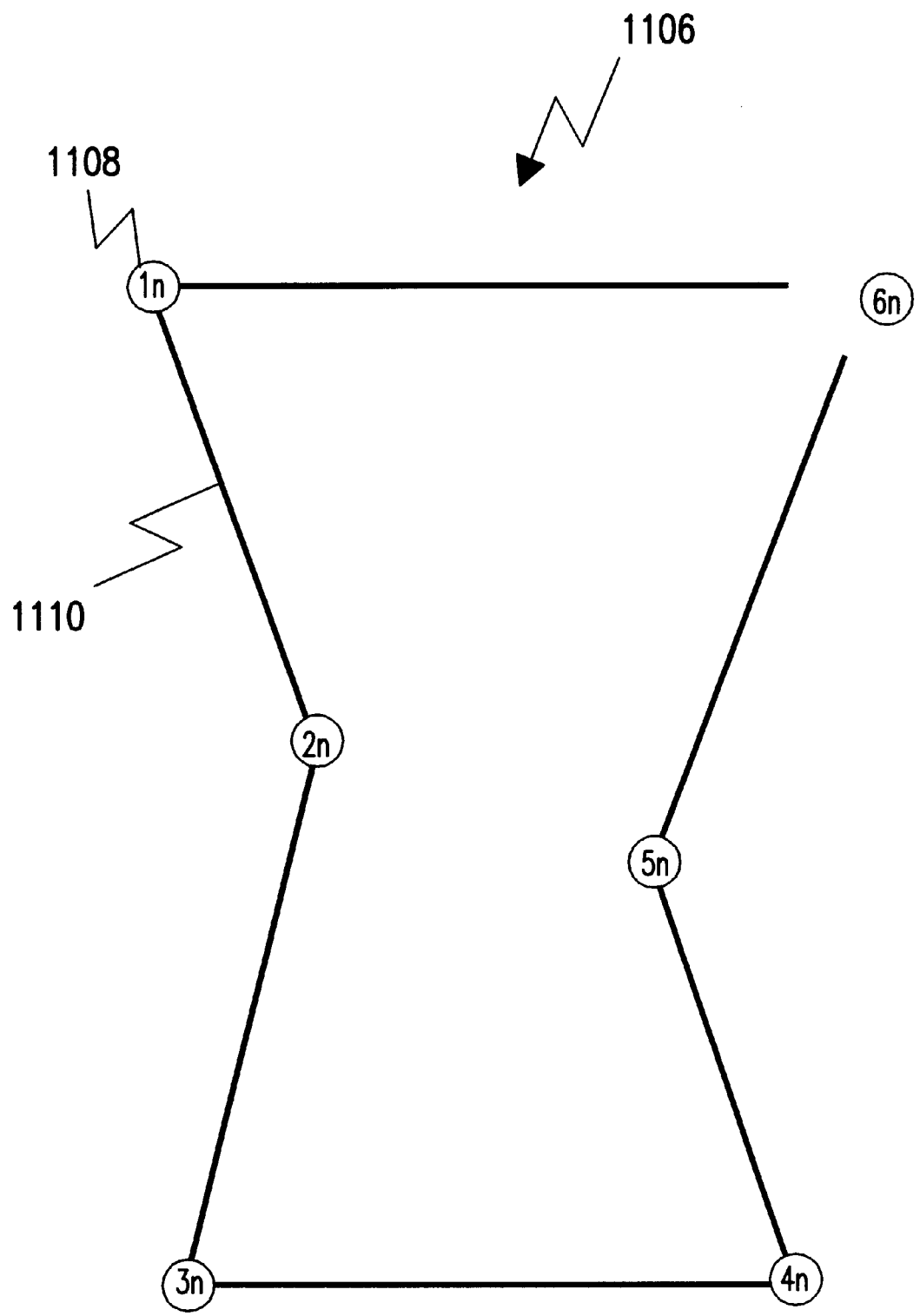
FIG. 11C depicts an example map boundary generated according to an interpolation between a source boundary and a target boundary.

FIG. 11C depicts an interpolated map boundary 1110, which is interpolation of source map boundary 1102 and target map boundary 1104 according to the formula above. The planar angle at each map vertex on the interpolated map boundary is equal to the weighted average of the planar angles at the corresponding map vertices on the source and target map boundaries, where the relative weighting is determined by interpolation parameter $\alpha$. For example, the planar angle at map vertex in (new_angle$_1$) is calculated by multiplying $(1-\alpha)$ times the planar angle at map vertex Is (source_angle$_1$) and adding a times the planar angle at map vertex It (target_angle$_1$). Similarly, the length of map edge 1n-2n (new_length$_1$) is calculated by multiplying $(1-\alpha)$ times the length of map edge 1s-2s (source length$_1$) and adding a times the length of map edge 1t-2t (target_length$_1$).

As shown in FIG. 11C, interpolated map boundary 1106 is no longer a self-crossing boundary. However, this result is not guaranteed in every case, depending on the particular boundaries involved and the value chosen for the interpolation parameter $\alpha$. If $\alpha$ is chosen such that the source map boundary is too heavily weighted (small $\alpha$), the resulting interpolated map boundary may still be self-crossing. A non-self-crossing map boundary can eventually be achieved by increasing the value of $\alpha$, thereby increasing the weight given to the target map boundary.

The interpolation parameter $\alpha$ is preferably selected by user 102. However, those skilled in the art will recognize that a could be pre-set (ie., 0.5, which accords equal weight to the source and target map boundaries) or chosen automatically based on any one of a variety of criteria.

This preferred interpolation is easy to implement and requires very little processing time. However, those skilled in the art will recognize that more sophisticated interpolations could be used at the cost of additional complexity and processing time. The fundamental idea remains the same: interpolating a source map boundary generated by an edge-and-angle proportional method with a target map boundary generated by any other conventional method.

Referring to FIG. 11C, interpolated map boundary 1110 is not closed at map vertex 6n. The preferred interpolation described above does not guarantee that the interpolated map boundary will be closed-in general the interpolated map boundary will not be closed. Therefore, in step 1206 the interpolated map boundary is closed by displacing the map vertices in the same manner as described above with respect to step 706 in FIG. 7.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A method for generating a planar map of a three-dimensional surface, comprising the steps of:
    a. receiving the surface, wherein the surface is a computer graphics surface, defined in three dimensions and includes at least three surface vertices interconnected by at least three edges;
    b. defining a surface boundary, wherein at least three of said surface vertices and an equal number of said surface edged form said surface boundary;
    c. generating a planar map wherein said planar map is a texture map, said planar map including a map boundary and at least three map vertices interconnected by at least three map edges, and wherein at least three of said map vertices and an equal number of said map edges form said map boundary, said generating step including:
        (i) performing an edge-and-angle proportional mapping of said surface boundary to create said map boundary, and
        (ii) relaxing surface vertices not forming said surface boundary to create said map vertices not forming said map boundary.

2. The method of claim 1, wherein each of said map vertices forming said map boundary corresponds to one of said surface vertices forming said surface boundary and each of said map edges forming said map boundary corresponds to one of said surface edges forming said surface boundary, and wherein said step of performing an edge-and-angle proportional mapping comprises the steps of:
    (a) calculating a surface angle at each of said surface vertices forming said surface boundary;
    (b) calculating an edge length of each of said surface edges forming said surface boundary; and
    (c) creating said map boundary, said map boundary having a planar angle at each of said map vertices forming said map boundary, wherein said planar angle is proportional to said surface angle at said corresponding one of said surface vertices, and each of said map edges forming said map boundary having a length proportional to said edge length of said corresponding one of said surface edges.

3. The method of claim 2, wherein said step of creating said map boundary comprises the steps of:
    (i) equating said planar angle at each of said map vertices forming said map boundary to said surface angle at said corresponding one of said surface vertices;
    (ii) adjusting said planar angle at each of said map vertices forming said map boundary in prorata fashion so that a total of said planar angles is $(n-2)\pi$, where n is the number of said map edges forming said map boundary; and
    (iii) displacing said map vertices forming said map boundary, thereby closing said map boundary.

4. The method of claim 1, wherein said step of generating a planar map further includes the step of pinning user-selected map vertices.

5. The method of claim 1, wherein said step of defining a surface boundary comprises cutting said surface boundary.

6. The method of claim 1, wherein said step of defining a surface boundary comprises sewing said surface boundary.

7. The method of claim 1, wherein said step of defining a surface boundary comprises tracing said surface boundary.

8. The method of claim 1, wherein said step of generating a planar map further includes, between steps (i) and (ii), the steps of:

(ia) performing a conventional mapping of said surface boundary to create a target map boundary;

(ib) interpolating said target map boundary and said map boundary to form an interpolated map boundary; and (ic) closing said interpolated map boundary.

9. A computer program product comprising a computer usable medium having computer program logic stored therein, wherein said computer program logic comprises:

receiving means for enabling a computer to receive a computer graphics surface, wherein said surface is defined in three dimensions and includes at least three surface vertices interconnected by at least three surface edges;

boundary means for enabling said computer to receive a surface boundary, wherein at least three of said surface vertices and an equal number of said surface edges form said surface boundary; and generating means for enabling said computer to generate a planar map wherein said planar map is a texture map, said planar map includes a map boundary and at least three map vertices interconnected by at least three map edges, and wherein at least three of said map vertices and an equal number of said map edges form said map boundary, said generating means including:

boundary mapping means for enabling said computer to perform an edge-and-angle proportional mapping of said surface boundary to create said map boundary, and relaxation means for enabling said computer to relax surface vertices not forming said map boundary.

10. The computer program product of claim 9, wherein each of said map vertices forming said map boundary corresponds to one of said surface vertices forming said surface boundary and each of said map edges forming said map boundary corresponds to one of said surface edges forming said surface boundary, and wherein said boundary mapping means comprises:

first calculating means for enabling said computer to calculate a surface angle at each of said surface vertices forming said surface boundary;

second calculating means for enabling said computer to calculate an edge length of each of said surface edges forming said surface boundary; and creating means for enabling said computer to create said map boundary, said map boundary having a planar angle at each of said map vertices forming said map boundary, wherein said planar angle is proportional to said surface angle at said corresponding one of said surface vertices, and each of said map edges forming said map boundary having a length proportional to said edge length of said corresponding one of said surface edges.

11. The computer program product of claim 10, wherein said creating means comprises:

equating means for enabling said computer to equate said planar angle at each of said map vertices forming said map boundary to said surface angle at said corresponding one of said surface vertices;

adjusting means for enabling said computer to adjust said planar angle at each of said map vertices forming said map boundary in prorata fashion so that the total of said planar angles is $(n-2)\pi$, where n is the number of said map edges forming said map boundary; and displacing means for enabling said computer to displace said map vertices forming said map boundary, thereby closing said map boundary.

12. The computer program product of claim 9, wherein said generating means further includes pinning means for enabling said computer to pin user-selected map vertices.

13. The computer program product of claim 9, wherein said boundary means comprises cutting means for enabling said computer to make user-selected cuts to said surface boundary.

14. The computer program product of claim 9, wherein said boundary means comprises sewing means for enabling said computer to make user-selected sews to said surface boundary.

15. The computer program product of claim 9, wherein said boundary means comprises tracing means for enabling said computer to trace said surface boundary.

16. The computer program product of claim 9, wherein said generating means further includes:

conventional mapping means for enabling said computer to perform a conventional mapping of said surface boundary to create a target map boundary;

interpolating means for enabling a computer to perform an interpolation of said target map boundary and said map boundary, thereby forming an interpolated map boundary; and second displacing means for enabling a computer to close said interpolated map boundary.

17. A system for generating a planar map of a three-dimensional surface, comprising:

means for receiving the surface, wherein the surface is defined in three dimensions and includes at least three surface vertices interconnected by at least three surface edges;

means for defining a surface boundary, wherein at least three of said surface vertices and an equal number of said surface edges form said surface boundary; and means for generating a planar map, said planar map includes a map boundary and at least three map vertices interconnected by at least three map edges, and wherein at least three of said map vertices and an equal number of said map edges form said map boundary, said generating means including:

means for performing an edge-and-angle proportional mapping of said surface boundary to create said map boundary, and means for relaxing surface vertices not forming said surface boundary to create said map vertices not forming said map boundary.

18. The system of claim 17, wherein each of said map vertices forming said map boundary corresponds to one of said surface vertices forming said surface boundary and each of said map edges forming said map boundary corresponds to one of said surface edges forming said surface boundary, and wherein said means for performing an edge-and-angle proportional mapping comprises:

means for calculating a surface angle at each of said surface vertices forming said surface boundary;

means for calculating an edge length of each of said surface edges forming said surface boundary; and means for creating said map boundary, said map boundary having a planar angle at each of said map vertices forming said map boundary, wherein said planar angle is proportional to said surface angle at said corresponding one of said surface vertices, and each of said map edges forming said map boundary having a length proportional to said edge length of said corresponding one of said surface edges.

19. The system of claim 18, wherein said means for creating said map boundary comprises:

means for equating said planar angle at each of said map vertices forming said map boundary to said surface angle at said corresponding one of said surface vertices;

means for adjusting said planar angle at each of said map vertices forming said map boundary in prorata fashion so that the total of said planar angles is $(n-2)\pi$, where n is the number of said map edges forming said map boundary; and means for displacing said map vertices forming said map boundary, thereby closing said map boundary.

20. The system of claim 19, wherein said means for generating a planar map further includes means for pinning user-selected map vertices.

* * * * *